US009286711B2

(12) United States Patent
Geisner et al.

(10) Patent No.: US 9,286,711 B2
(45) Date of Patent: Mar. 15, 2016

(54) REPRESENTING A LOCATION AT A PREVIOUS TIME PERIOD USING AN AUGMENTED REALITY DISPLAY

(75) Inventors: Kevin A. Geisner, Mercer Island, WA (US); Kathryn Stone Perez, Kirkland, WA (US); Stephen G. Latta, Seattle, WA (US); Ben J. Sugden, Woodinville, WA (US); Benjamin I. Vaught, Seattle, WA (US); Alex Aben-Athar Kipman, Redmond, WA (US); John Clavin, Seattle, WA (US); Jonathan T. Steed, Redmond, WA (US); Jason Scott, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 181 days.

(21) Appl. No.: 13/535,213

(22) Filed: Jun. 27, 2012

(65) Prior Publication Data
US 2013/0083011 A1 Apr. 4, 2013

Related U.S. Application Data

(63) Continuation-in-part of application No. 13/250,878, filed on Sep. 30, 2011.

(51) Int. Cl.
*G09G 5/00* (2006.01)
*G06T 15/00* (2011.01)
(Continued)

(52) U.S. Cl.
CPC ............. *G06T 15/00* (2013.01); *G02B 27/017* (2013.01); *G06T 19/006* (2013.01); *G08G 1/00* (2013.01);
(Continued)

(58) Field of Classification Search
CPC ............ G02B 27/017; G02B 2027/0178; G02B 2027/0138; G06T 19/006

USPC .......................................................... 345/633
See application file for complete search history.

(56) References Cited

U.S. PATENT DOCUMENTS 5,333,874 A 8/1994 Arnold et al.
5,401,026 A 3/1995 Eccher et al.
(Continued)

FOREIGN PATENT DOCUMENTS

| CN | 101470102 A | 7/2009 |
| CN | 101515198 A | 8/2009 |
| EP | 1435737 A1 | 7/2004 |

OTHER PUBLICATIONS

Herbst et al., TimeWarp: Interactive Time Travel with a Mobile Mixed Reality Game; ACM MobileHCI '08 Proceedings of the 10th international conference on Human computer interaction with mobile devices and services, Sep. 2-5, 2008, pp. 235-244.*
(Continued)

*Primary Examiner* — M Good Johnson
(74) *Attorney, Agent, or Firm* — Dan Choi; Judy Yee; Micky Minhas

(57) ABSTRACT

Technology is described for representing a physical location at a previous time period with three dimensional (3D) virtual data displayed by a near-eye, augmented reality display of a personal audiovisual (A/V) apparatus. The personal A/V apparatus is identified as being within the physical location, and one or more objects in a display field of view of the near-eye, augmented reality display are automatically identified based on a three dimensional mapping of objects in the physical location. User input, which may be natural user interface (NUI) input, indicates a previous time period, and one or more 3D virtual objects associated with the previous time period are displayed from a user perspective associated with the display field of view. An object may be erased from the display field of view, and a camera effect may be applied when changing between display fields of view.

20 Claims, 16 Drawing Sheets

(51) Int. Cl.
*G06T 19/00* (2011.01)
*G08G 1/00* (2006.01)
*G02B 27/01* (2006.01)
*G06F 3/147* (2006.01)
*G09G 3/00* (2006.01)

(52) U.S. Cl.
CPC ............ *G09G 5/00* (2013.01); *G02B 2027/014* (2013.01); *G02B 2027/0138* (2013.01); *G02B 2027/0178* (2013.01); *G02B 2027/0187* (2013.01); *G06F 3/147* (2013.01); *G09G 3/003* (2013.01)

(56) References Cited

U.S. PATENT DOCUMENTS

| | | | |
|---|---|---|---|
| 5,728,006 A | 3/1998 | Teitell et al. | |
| 5,762,561 A | 6/1998 | Zine | |
| 5,826,578 A | 10/1998 | Curchod | |
| 5,826,874 A | 10/1998 | Teitell et al. | |
| 6,120,461 A | 9/2000 | Smyth | |
| 6,217,444 B1 | 4/2001 | Kataoka et al. | |
| 6,224,387 B1 | 5/2001 | Jones | |
| 6,517,353 B1 | 2/2003 | Jones | |
| 6,567,536 B2 | 5/2003 | McNitt et al. | |
| 6,623,370 B1 | 9/2003 | Willer | |
| 6,663,498 B2 | 12/2003 | Stipan | |
| 6,767,282 B2 | 7/2004 | Matsuyama et al. | |
| 7,057,582 B2 | 6/2006 | Ebersole | |
| 7,401,920 B1 | 7/2008 | Kranz et al. | |
| 7,458,894 B2 | 12/2008 | Danieli et al. | |
| 7,671,916 B2 | 3/2010 | Hashimoto | |
| 7,693,702 B1 | 4/2010 | Kerner et al. | |
| 7,744,482 B1 | 6/2010 | Watson | |
| 7,815,516 B1 | 10/2010 | Mortimer et al. | |
| 7,817,104 B2 | 10/2010 | Ryu et al. | |
| 7,922,586 B2 | 4/2011 | Heckendorf, III et al. | |
| 8,217,856 B1* | 7/2012 | Petrou ........................... | 345/8 |
| 8,235,529 B1* | 8/2012 | Raffle et al. ................... | 351/209 |
| 8,432,489 B2 | 4/2013 | Arseneau et al. | |
| 8,467,133 B2* | 6/2013 | Miller ........................... | 359/630 |
| 8,477,425 B2* | 7/2013 | Border et al. ................. | 359/630 |
| 2003/0227470 A1 | 12/2003 | Genc | |
| 2005/0113649 A1 | 5/2005 | Bergantino | |
| 2005/0227791 A1 | 10/2005 | McCreary et al. | |
| 2006/0038833 A1 | 2/2006 | Mallinson et al. | |
| 2006/0053377 A1 | 3/2006 | Newell | |
| 2006/0230123 A1 | 10/2006 | Simmons et al. | |
| 2006/0250322 A1 | 11/2006 | Hall | |
| 2006/0277474 A1 | 12/2006 | Robarts | |
| 2007/0013515 A1 | 1/2007 | Johnson | |
| 2007/0024438 A1 | 2/2007 | Chen | |
| 2007/0035563 A1 | 2/2007 | Biocca et al. | |
| 2007/0088746 A1 | 4/2007 | Baker | |
| 2008/0018667 A1 | 1/2008 | Cheng | |
| 2008/0073430 A1 | 3/2008 | Sickenius | |
| 2008/0082465 A1 | 4/2008 | Meijer et al. | |
| 2008/0147325 A1 | 6/2008 | Maassel et al. | |
| 2008/0204450 A1 | 8/2008 | Dawson et al. | |
| 2008/0259096 A1 | 10/2008 | Huston | |
| 2009/0102859 A1* | 4/2009 | Athsani et al. ................ | 345/619 |
| 2009/0111434 A1 | 4/2009 | Yu | |
| 2009/0144081 A1 | 6/2009 | Harlan | |
| 2009/0154293 A1 | 6/2009 | Sengupta et al. | |
| 2009/0167787 A1 | 7/2009 | Bathiche et al. | |
| 2009/0189974 A1 | 7/2009 | Deering | |
| 2009/0262946 A1 | 10/2009 | Dunko | |
| 2009/0265381 A1 | 10/2009 | Canu et al. | |
| 2009/0300551 A1 | 12/2009 | French et al. | |
| 2010/0030578 A1 | 2/2010 | Siddique et al. | |
| 2010/0035726 A1 | 2/2010 | Fisher et al. | |
| 2010/0045701 A1 | 2/2010 | Scott et al. | |
| 2010/0111387 A1 | 5/2010 | Christiansen, II et al. | |
| 2010/0149073 A1 | 6/2010 | Chaum et al. | |
| 2010/0164990 A1 | 7/2010 | Van Doorn | |
| 2010/0171758 A1 | 7/2010 | Maassel et al. | |
| 2010/0199232 A1 | 8/2010 | Mistry et al. | |
| 2010/0208033 A1 | 8/2010 | Edge et al. | |
| 2010/0238161 A1 | 9/2010 | Varga et al. | |
| 2010/0257252 A1 | 10/2010 | Dougherty et al. | |
| 2010/0287485 A1 | 11/2010 | Bertolami et al. | |
| 2010/0302142 A1 | 12/2010 | French et al. | |
| 2010/0315418 A1 | 12/2010 | Woo | |
| 2011/0065496 A1 | 3/2011 | Gagner et al. | |
| 2011/0087137 A1 | 4/2011 | Hanoun | |
| 2011/0098109 A1 | 4/2011 | Leake et al. | |
| 2011/0112904 A1 | 5/2011 | Stupp | |
| 2011/0119640 A1 | 5/2011 | Berkes et al. | |
| 2011/0137724 A1 | 6/2011 | Ramchandran | |
| 2011/0151955 A1 | 6/2011 | Nave | |
| 2011/0187744 A1 | 8/2011 | Kim et al. | |
| 2011/0218839 A1 | 9/2011 | Shamaiengar | |
| 2011/0221656 A1 | 9/2011 | Haddick et al. | |
| 2011/0221793 A1 | 9/2011 | King, III et al. | |
| 2011/0237331 A1 | 9/2011 | Doucet et al. | |
| 2011/0249122 A1* | 10/2011 | Tricoukes et al. ............ | 348/158 |
| 2011/0270135 A1 | 11/2011 | Dooley et al. | |
| 2011/0301927 A1 | 12/2011 | Ok | |
| 2011/0318717 A1 | 12/2011 | Adamowicz | |
| 2012/0005222 A1 | 1/2012 | Bhagwan et al. | |
| 2012/0062445 A1 | 3/2012 | Haddick et al. | |
| 2012/0068980 A1 | 3/2012 | Kitahara | |
| 2012/0072302 A1 | 3/2012 | Chen et al. | |
| 2012/0113223 A1 | 5/2012 | Hilliges et al. | |
| 2012/0120499 A1 | 5/2012 | Harrison | |
| 2012/0133650 A1 | 5/2012 | Lee | |
| 2012/0166578 A1* | 6/2012 | Hong ............................. | 709/217 |
| 2012/0212398 A1 | 8/2012 | Border et al. | |
| 2012/0212499 A1* | 8/2012 | Haddick et al. ............... | 345/589 |
| 2012/0233002 A1 | 9/2012 | Abujbara | |
| 2012/0236031 A1* | 9/2012 | Haddick et al. ............... | 345/633 |
| 2012/0242698 A1* | 9/2012 | Haddick et al. ............... | 345/633 |
| 2012/0253485 A1 | 10/2012 | Weast et al. | |
| 2012/0299962 A1* | 11/2012 | White et al. .................. | 345/633 |
| 2012/0329432 A1 | 12/2012 | Gupta | |
| 2013/0065692 A1 | 3/2013 | Aronzon et al. | |
| 2013/0077049 A1 | 3/2013 | Bohn | |
| 2013/0139082 A1* | 5/2013 | Wheeler et al. ............... | 715/765 |
| 2013/0246967 A1* | 9/2013 | Wheeler et al. ............... | 715/784 |
| 2013/0265333 A1 | 10/2013 | Ainsworth | |

OTHER PUBLICATIONS

Guven et al., Interaction Techniques for Exploring Historic Sites through Situated Media, IEEE Symposium on 3D User Interfaces, Mar. 25-29, 2006, pp. 111-118.*
Office Action dated Sep. 4, 2013 in U.S. Appl. No. 13/631,511, 32 pages.
Response dated Feb. 4, 2014 to Office Action in U.S. Appl. No. 13/631,511, 10 pages.
"GSA Advanced Golf Simulators", [retrieved on Nov. 14, 2011], Retrieved from the Internet: <URL:http://www.golf-simulators.com/Software.htm>, 12 pages.
Conroy, "How to Create Your Own Virtual Golf Course Game", [retrieved on Nov. 14, 2011], Retrieved from the Internet: <URL:http://www.ehow.com/how_5672075_create-virtual-golf-course-game.html>, 5 pages.
Bonanni, et al., "CounterIntelligence: Augmented Reality Kitchen," In Proceedings of the Conference of Abstracts of Computer Human Interaction, Apr. 2-7, 2005, ACM Press, 7 pages.
Guo, et al., "FoodJoy: What's for dinner? FoodJoy Helps you Decide", addy lee, HCI Masters Student Georgia Tech [online], 2005 [retrieved on Dec. 14, 2011], Retrieved from the Internet: <URL:http://www.addylee.com/hci/portfolio.htm>, 1 page.
Jang, et al., "Augmented Reality Cooking System Using Tabletop Display Interface", In Proceedings of the 5th International Symposium on Ubiquitous Virtual Reality, Jul. 2007, 2 pages.
Joutou, et al., "A Food Image Recognition System With Multiple Kernel Learning," 16th IEEE International Conference on Image Processing, Nov. 2009, pp. 285-288, 4 pages.

(56) References Cited

OTHER PUBLICATIONS

Lee, et al., "Design and Implementation of an Augmented Reality System Using Gaze Interaction", In Proceedings of the International Conference on Information Science and Applications, Apr. 26-29, 2011, 8 pages.
Mankoff, et al., "Domisilica: Providing Ubiquitous Access to the Home", In Technical Report, GVU, College of Computing Center, Georgia Institute of Technology, 1997 [retrieved on Dec. 14, 2011], retrieved from the Internet: <URL:http://www.cc.gatech.edu/fce/domisilica/publications/uist97.html>, 8 pages.
Real, et al., "Augmented reality system for inventorying," 2011 6th Iberian Conference on Information Systems and Technologies (CISTI), Jun. 18, 2011, 9 pages.
Välkkynen, et al., "Mobile Augmented Reality for Retail Environments", In Mobile HCI Workshop on Mobile Interaction in Retail Environments, Aug. 30, 2011, 4 pages.
Winlock, et al., "Toward Real-Time Grocery Detection for the Visually Impaired," IEEE Computer Society Conference on Computer Vision and Pattern Recognition Workshops, Jun. 2010, 8 pages.
U.S. Appl. No. 13/250,878, filed Sep. 30, 2011.
U.S. Appl. No. 13/436,526, filed Mar. 30, 2012.
Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.
Narzt, et al., "Augmented Reality Navigation Systems", In Proceedings of Universal Access in the Information Society, vol. 4 Issue 3, Dec. 21, 2005, pp. 177-187, 11 pages.
Nilsen, et al., "Motivations for Augmented Reality Gaming", In Proceedings of FUSE, New Zealand Game Developers Conference, vol. 4, Jun. 29, 2004, 8 pages.
Vlahakis, et al., "Personalized Augmented Reality Touring of Archaeological Sites with Wearable and Mobile Computers", In Proceedings of the 6th International Symposium on Wearable Computers, Oct. 2002, 8 pages.
U.S. Appl. No. 13/538,923, filed Jun. 29, 2012.
Doswell, et al., "Extending the 'Serious Game' Boundary: Virtual Instructors in Mobile Mixed Reality Learning Games", In Digital Games Research Association International Conference, Sep. 27, 2007, pp. 524-529, 6 pages.
International Search Report and Written Opinion of the International Searching Authority, dated Dec. 26, 2012 in International Patent Application No. PCT/US2012/058169, 8 pages.
Office Action dated Jul. 26, 2013 in U.S. Appl. No. 13/250,878, 24 pages.
Response to Office Action filed Oct. 18, 2013, in U.S. Appl. No. 13/250,878, 9 pages.
Office Action dated Feb. 4, 2014, in U.S. Appl. No. 13/250,878, 43 pages.
Response to Office Action filed May 2, 2014, in U.S. Appl. No. 13/250,878, 10 pages.
Office Action dated May 21, 2014, in U.S. Appl. No. 13/250,878, 48 pages.
Office Action dated Aug. 13, 2014 in U.S. Appl. No. 13/538,923, 64 pages.
John W. Ruffner et al., "Near-Eye Augmented Reality Tower Controller Displays: Human Performance Issues;" Interservice/Industry Training, Simulation, and Education Conference (I/ITSEC) Paper No. 2518, 2006, 11 pages.
Response to Office Action filed Aug. 21, 2014, in U.S. Appl. No. 13/250,878, 12 pages.
Response to Office Action filed Dec. 15, 2014, in U.S. Appl. No. 13/538,923, 12 pages.
Final Office Action dated Nov. 21, 2014, in U.S. Appl. No. 13/250,878, 44 pages.
Response to Final Office Action filed Feb. 14, 2015, in U.S. Appl. No. 13/250,878, 11 pages.
Final Office Action dated Feb. 23, 2015, in U.S. Appl. No. 13/538,923, 45 pages.
Office Action dated Mar. 13, 2015, in U.S. Appl. No. 13/250,878, 41 pages.
Barakonyi, et al., "Agents That Talk and Hit Back: Animated Agents in Augmented Reality" Proceedings of the Third IEEE, 2004.
Monica Tavanti, "Augmented reality for tower: using scenarios for describing tower activities" 26th Digital Avionics Systems Conference, IEEE, Publication Year: 2007.
Response to Final Office Action dated May 12, 2015, in U.S. Appl. No. 13/538,923, 16 pages.
Office Action dated Apr. 17, 2015 with partial English translation, in China Patent Application No. 201210378687.3, 13 pages.
English Abstract of CN101470102A, published Jul. 1, 2009.
English Abstract of CN101515198A, published Aug. 26, 2009.
Office Action response dated Jun. 15, 2015, in U.S. Appl. No. 13/250,878, 11 pages.
Response to Office Action with English Summary dated Jul. 28, 2015 in Chinese Patent Application No. 201210378687.3, 17 pages.
Notice of Allowance dated Sep. 9, 2015 in U.S. Appl. No. 13/538,923, 21 pages.
Office Action dated Sep. 9, 2015 in U.S. Appl. No. 13/250,878, 50 pages.
Office Action with English summary dated Oct. 27, 2015 in Chinese Patent Application No. 201210378687.3, 7 pages.
Response to Office Action with English summary and amended claims dated Jan. 5, 2016 in Chinese Patent Application No. 201210378687.3, 14 pages.

* cited by examiner

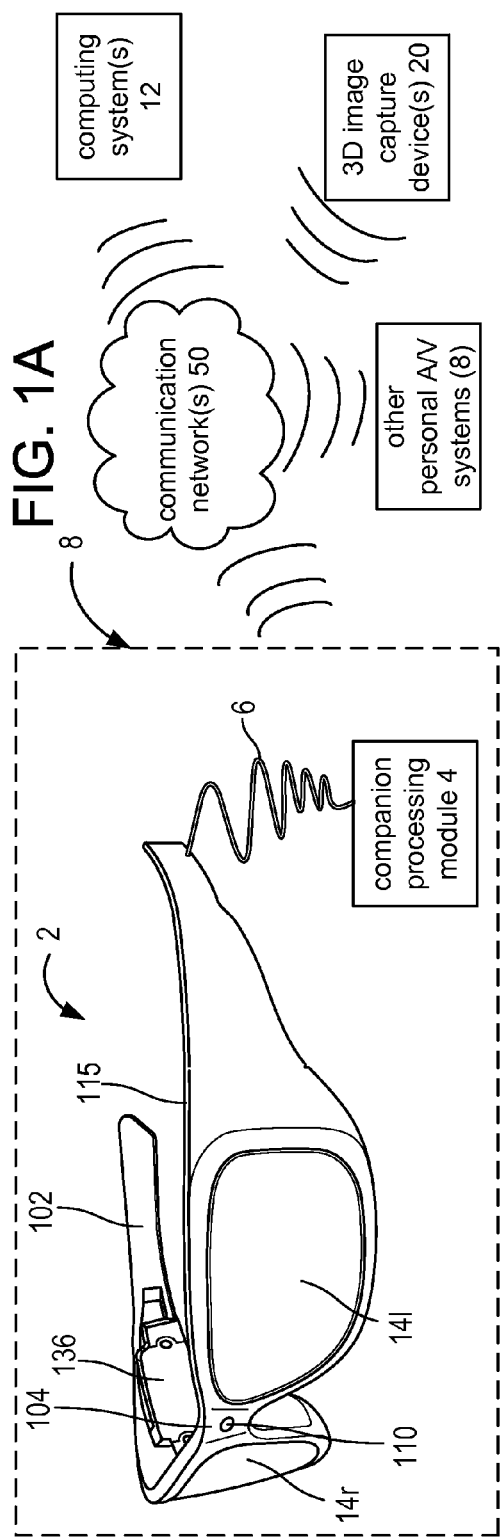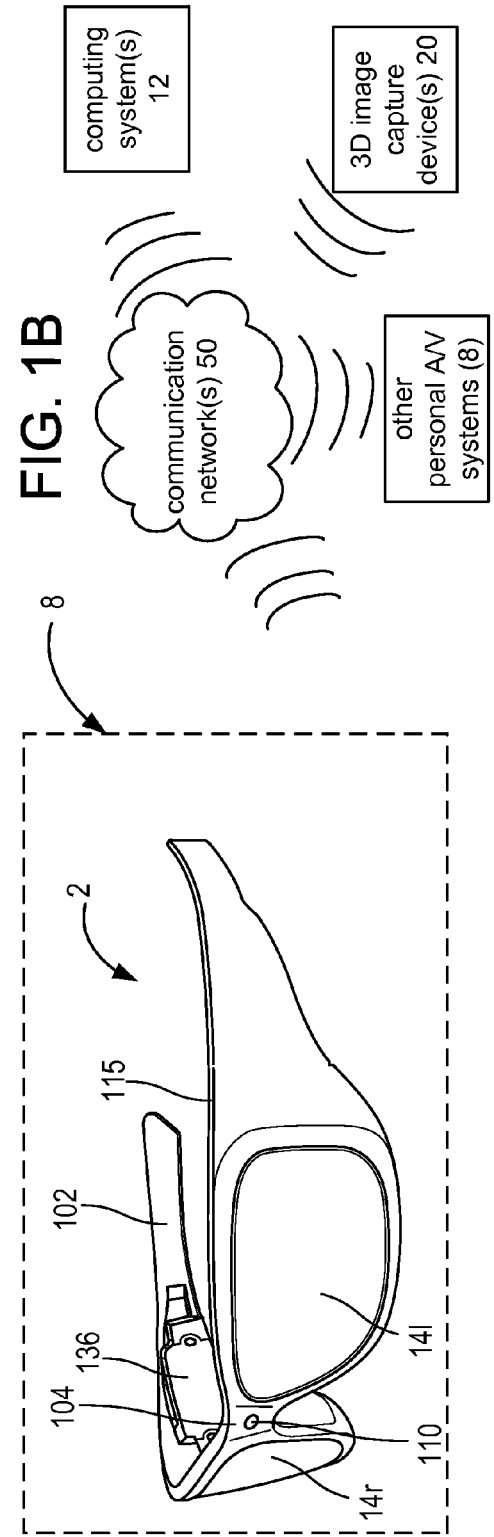

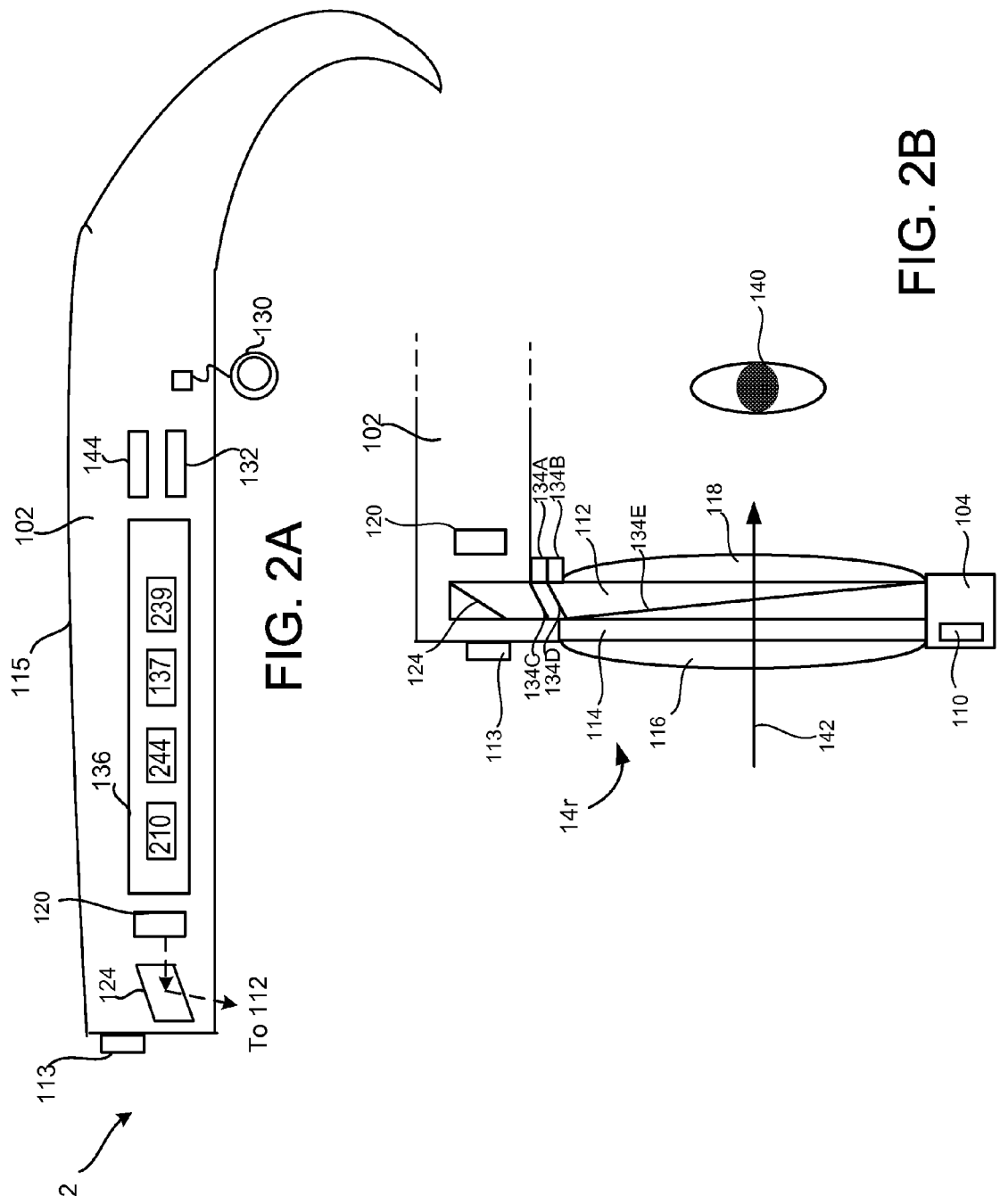

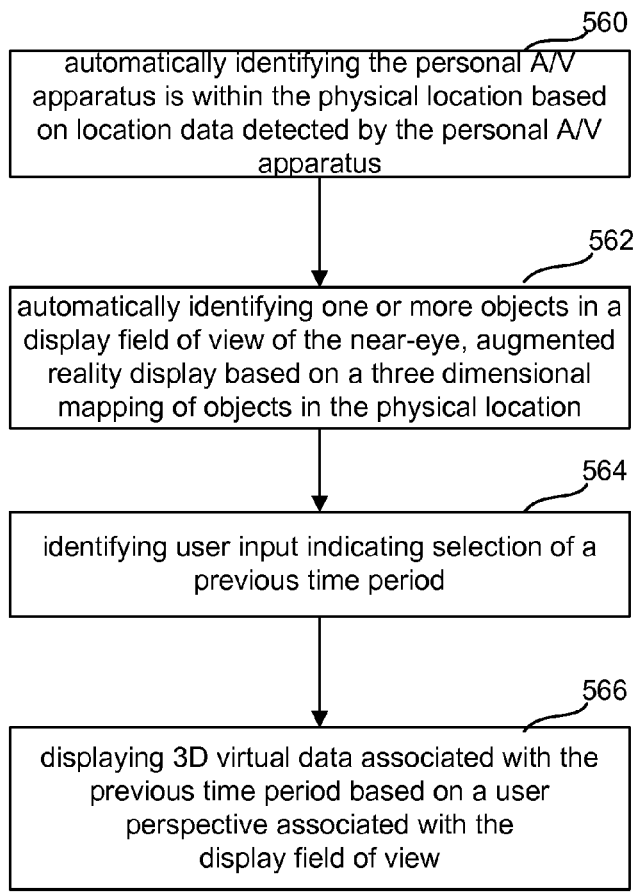
FIG. 6A
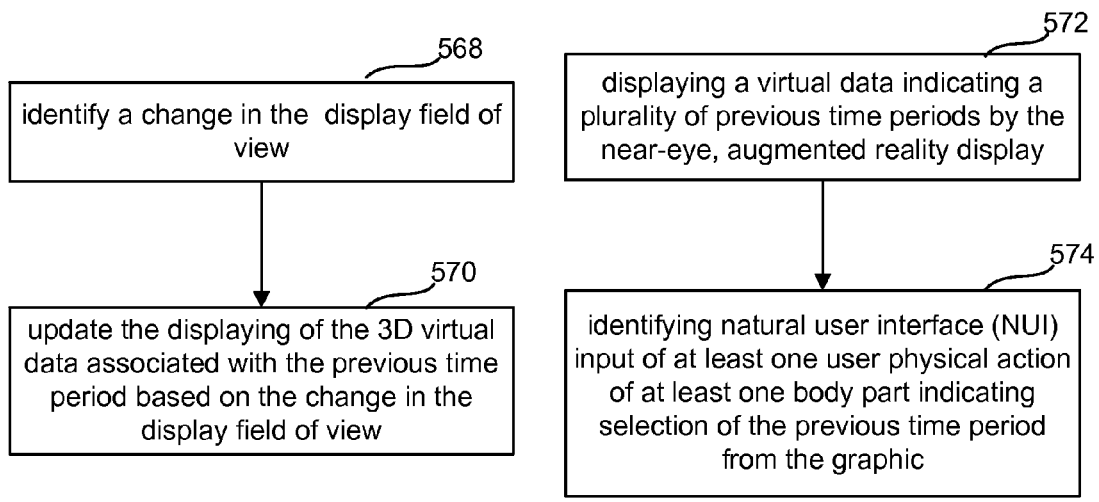
FIG. 6B
FIG. 6C

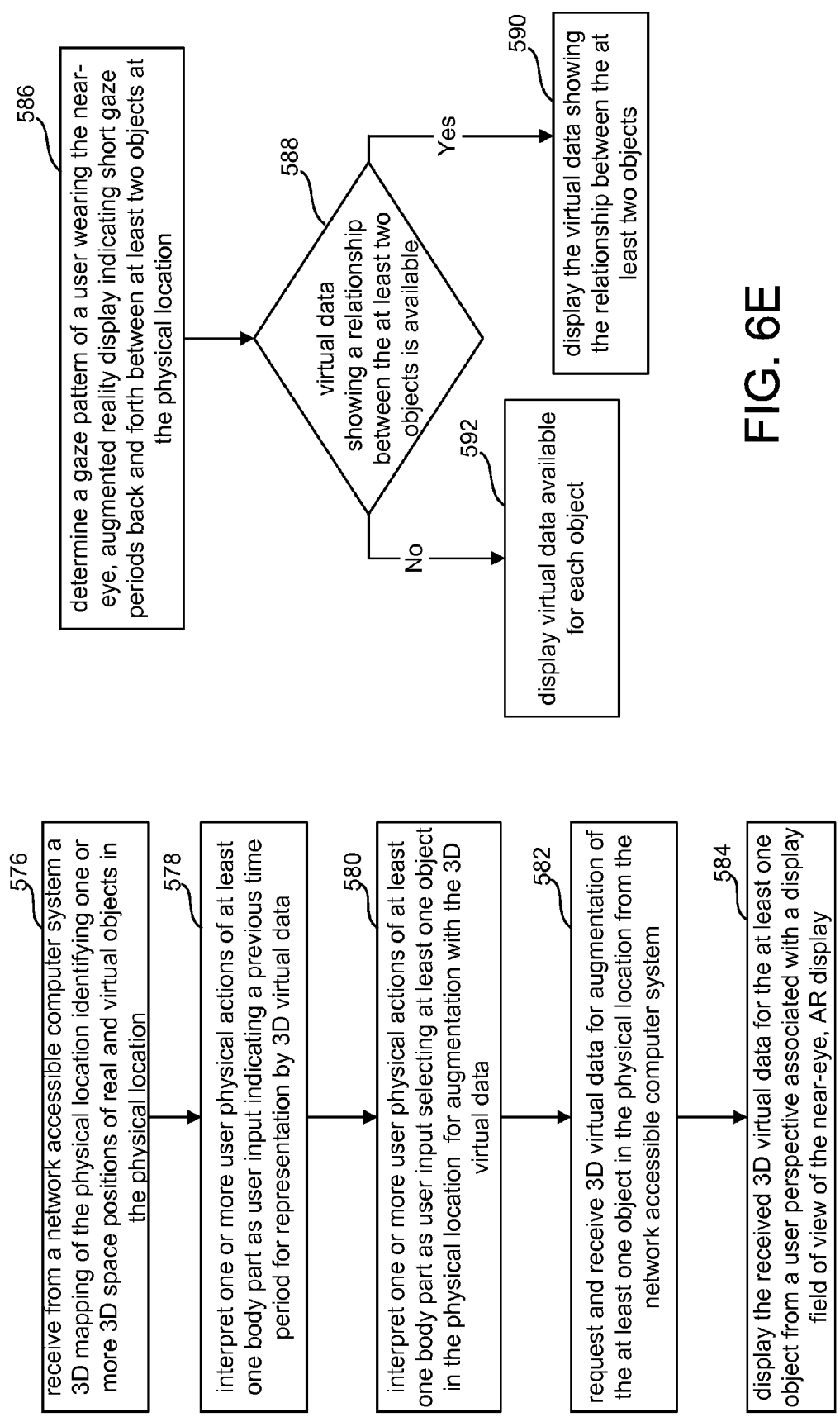

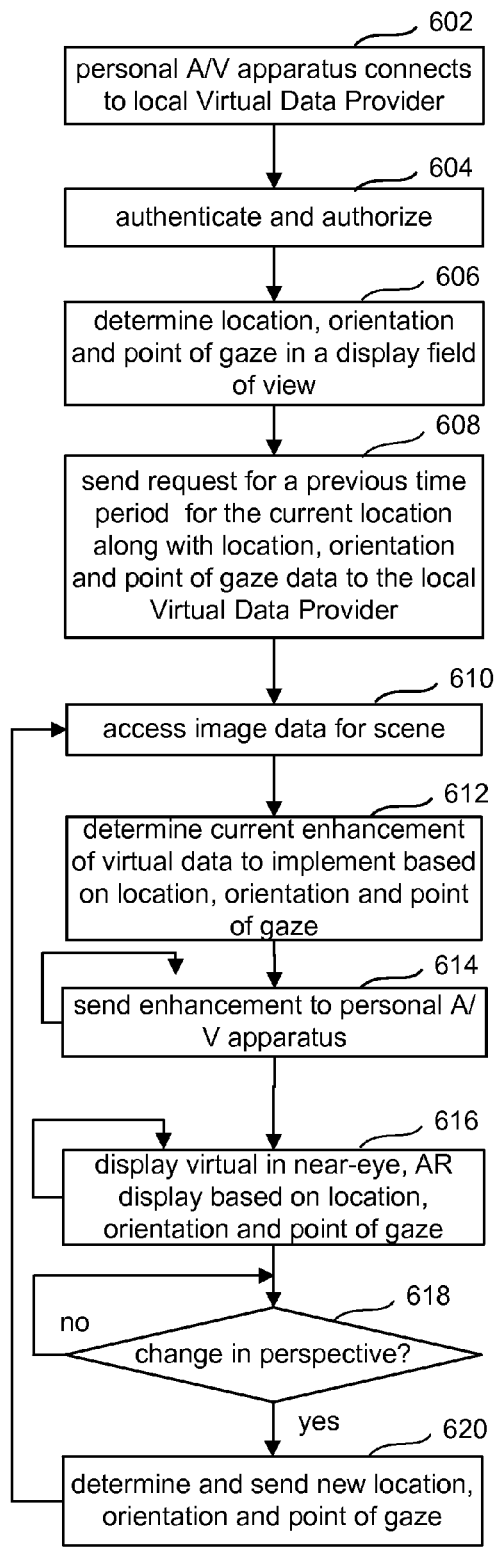
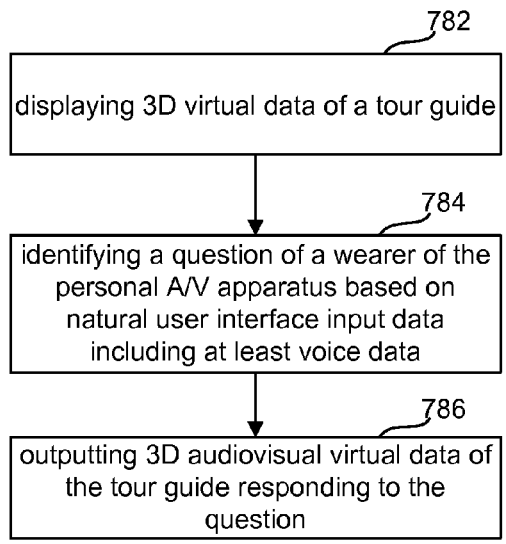
FIG. 8B
FIG. 7

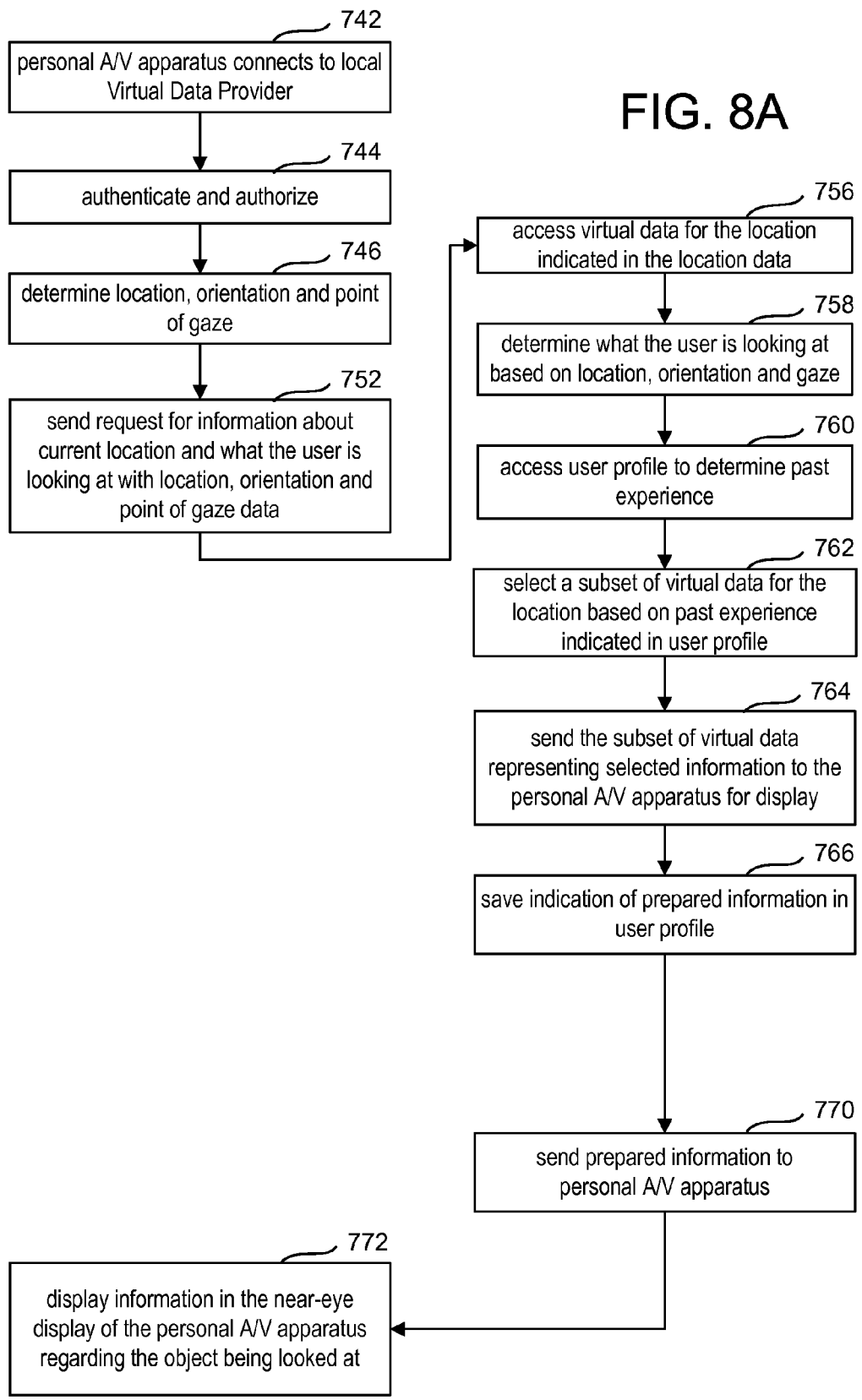

REPRESENTING A LOCATION AT A PREVIOUS TIME PERIOD USING AN AUGMENTED REALITY DISPLAY

CROSS-REFERENCE TO RELATED APPLICATIONS

This is a continuation-in-part application of U.S. patent application Ser. No. 13/250,878, titled "Personal Audio/Visual System," to K. Stone-Perez et al., filed Sep. 30, 2011, and incorporated herein by reference.

BACKGROUND

People visit locations like historical sites and sports stadiums because of one or more events which occurred there. Occasionally, there may be a re-enactment, for example a re-enactment of a battle scene by volunteers. Visitors plan their visit around scheduled times for popular segments of the re-enactment, and the viewing areas for such segments are often crowded. Often at a visitor center for the site, there is a theater where an informational movie is played periodically highlighting points at the site to visit where significant events occurred. The visitors armed with pamphlets follow signs or a human guide describing the events which the visitors imaginations bring into action in their minds.

SUMMARY

Technology is described for representing a physical location at a previous time period with three dimensional (3D) virtual data displayed by a near-eye, augmented reality display of a personal audiovisual (A/V) apparatus. Additionally, the viewing experience for the user may be enhanced by a camera effect and selective erasing of an object from display.

The technology provides one or more embodiments of a method for representing a physical location at a previous time period with three dimensional (3D) virtual data displayed by a near-eye, augmented reality display of a personal audiovisual (A/V) apparatus. An embodiment of the method comprises automatically identifying that the personal A/V apparatus is within the physical location based on location data detected by the personal A/V apparatus and automatically identifying one or more objects in a display field of view of the near-eye, augmented reality display based on a three dimensional mapping of objects in the physical location. User input is identified indicating selection of a previous time period. Three dimensional (3D) virtual data associated with the previous time period based on the one or more objects in the display field of view and based on a user perspective associated with the display field of view.

The technology provides one or more embodiments of a personal audiovisual (A/V) apparatus for representing a physical location at a previous time period with three dimensional (3D) virtual data. An embodiment of the personal A/V apparatus comprises a near-eye, augmented reality display having a display field of view and being supported by a near-eye support structure. One or more processors are communicatively coupled to a network accessible computer system for accessing one or more memories storing 3D virtual data associated with one or more objects in the physical location. The accessible 3D virtual data represents the one or more objects in the physical location for at least one previous time period.

The embodiment of the apparatus further comprises a natural user interface (NUI) for interpreting one or more user physical actions of at least one body part as user input selecting at least one object in the physical location for augmentation with the 3D virtual data. The NUI also interprets the one or more user physical actions of at least one body part as user input indicating a previous time period for representation by the 3D virtual data. The one or more processors control the near-eye, augmented reality display of the personal A/V apparatus for displaying the 3D virtual data for the at least one object from a user perspective associated with a display field of view of the display.

The technology provides one or more embodiments of one or more processor readable storage devices comprising instructions encoded thereon which instructions cause one or more processors to execute a method for representing a physical location at a previous time period with three dimensional (3D) virtual data displayed by a near-eye, augmented reality display of a personal audiovisual (A/V) apparatus. An embodiment of the method comprises automatically identifying the personal A/V apparatus is within the physical location based on location data detected by the personal A/V apparatus, and automatically identifying one or more objects in a first display field of view of the near-eye, augmented reality display based on a three dimensional mapping of objects in the physical location. User input is identified as indicating selection of a previous time period. Three dimensional (3D) virtual data associated with the previous time period is displayed based on a user perspective associated with the first display field of view.

Additionally, user input is identified which indicates a request for a second display field of view having a different level of detail than the first display field of view and including at least one object of interest of the first display field of view. The first display field of view is changed to the second display field of view.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of an embodiment of a personal audiovisual (A/V) apparatus having a near-eye, augmented reality display.

FIG. 1B is a block diagram depicting example components of another embodiment of a personal audiovisual (A/V) apparatus having a near-eye, augmented reality display.

FIG. 2A is a side view of an eyeglass temple of a frame in an embodiment of the personal audiovisual (A/V) apparatus having an optical see-through, augmented reality display embodied as eyeglasses providing support for hardware and software components.

FIG. 2B is a top view of an embodiment of a display optical system of a near-eye, optical see-through, augmented reality display.

FIG. 6A is a flowchart of an embodiment of a method for representing a physical location at a previous time period with three dimensional (3D) virtual data displayed by a near-eye, augmented reality display of a personal A/V apparatus.

FIG. 6B is a flowchart of some exemplary steps of updating the display of objects associated with the previous time period due to a change in the display field of view FIG. 6C is a flowchart of an example of a process for identifying user input indicating selection of a previous time period.

FIG. 6D is a flowchart of another embodiment of a method for representing a physical location at a previous time period with three dimensional (3D) virtual data displayed by a near-eye, augmented reality display of a personal A/V apparatus.

FIG. 6E is a flowchart of an embodiment of a process for selecting virtual data for display based on a gaze pattern of a user of the personal A/V apparatus.

FIG. 7 is a flow chart of yet another embodiment of a method for representing a physical location at a previous time period with three dimensional (3D) virtual data displayed by a near-eye, augmented reality display of a personal A/V apparatus process.

FIG. 8A is a flow chart describing an embodiment of a process for using a personal A/V apparatus as a virtual guide.

FIG. 8B is a flow chart describing an embodiment of a process for providing an interactive tour guide.

DETAILED DESCRIPTION

Figure 3A:
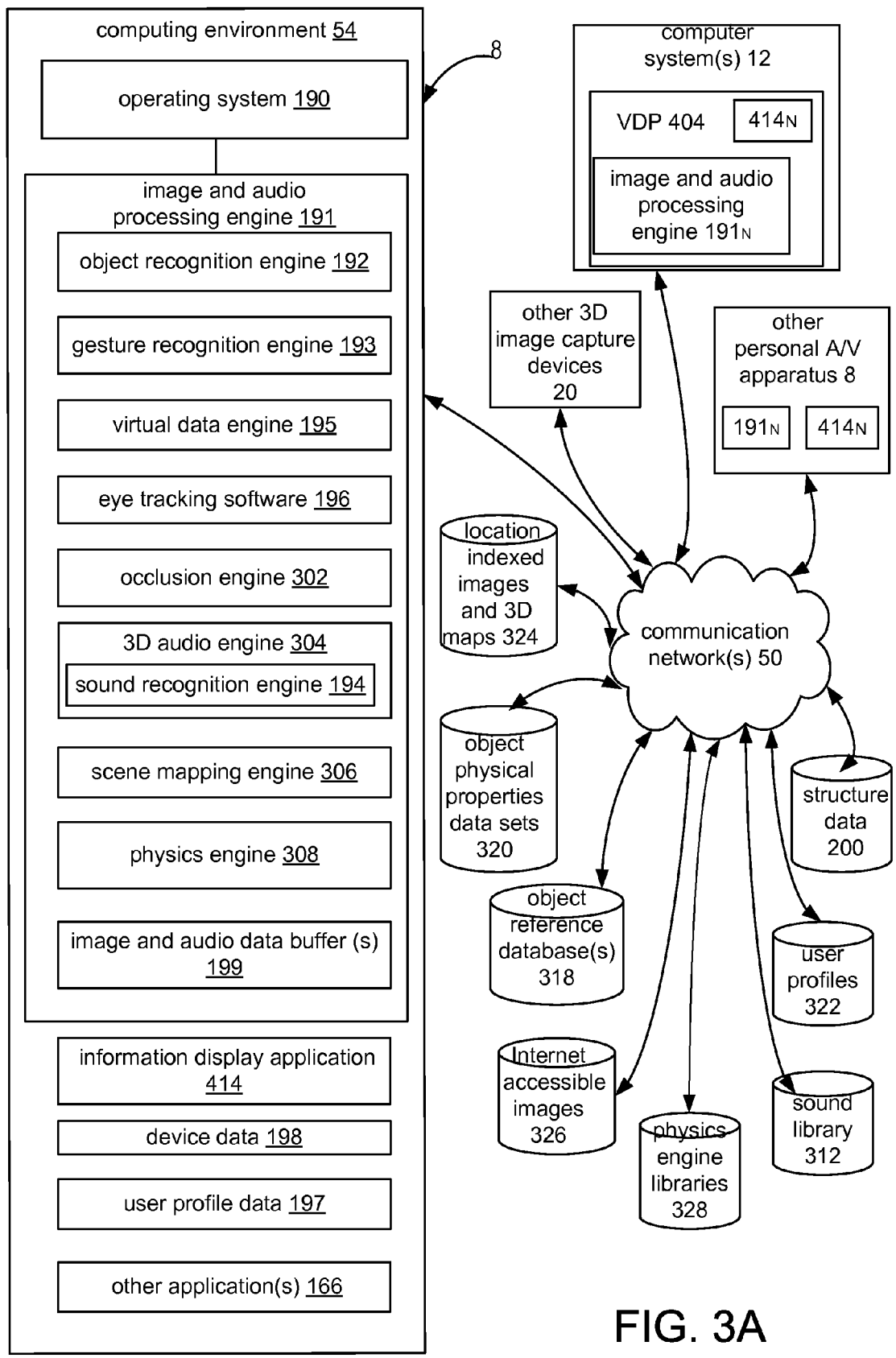
FIG. 3A is a block diagram of a system from a software perspective for representing a physical location at a previous time period with three dimensional (3D) virtual data being displayed by a near-eye, augmented reality display of a personal audiovisual (A/V) apparatus.

A system with a personal A/V apparatus can be used to graphically or visually show the history of a certain physical location. For example, a castle or heritage site can be made to come alive. A user can see what the heritage site looked like at different points in the past. A scene from history can also be played out. For example, the user can see a castle and watch daily life around the castle or watch a battle being forged. Historical reenactments can be made at the modern day locations of the site of the original event. In one example, a user can be at a non-famous location and have the personal A/V apparatus show the user one or more events that have happened at that location at certain points in history. Another example could be a user walking through a city while the personal A/V apparatus shows the user where various movies were made, by pointing out the location and/or displaying the scene from the movie. In each of these embodiments, virtual data augments a real world view as seen through a near-eye, augmented reality (AR) display of the personal A/V system. Additionally, in the embodiments discussed below, a user perspective for viewing virtual data augmenting the physical location is not predefined. The user controls his or her view seen through the display by his or her movement and, in many embodiments, gaze.

Image data may be moving image data like video as well as still image data. Image data may also be three dimensional. An example of 3D image data is a hologram. Image data may be that captured, and in some examples displayed, of real objects, or image data may be generated to illustrate virtual objects or imagery. Virtual image data, referred to hereafter as virtual data, is image data of a virtual object or virtual effect. An example of a virtual effect is an atmospheric condition like fog or rain. Another example may be a simulated effect on a real object, like a smashing of a window when the real is still intact, or a displayed change of color of one's shirt. Image data or virtual image data which is registered to an object, real or virtual, means the data tracks its position in the display field of view in reference to or dependent upon a position of the object to which it is registered.

Before describing some embodiments of a personal A/V apparatus with a near-eye, AR display, it is noted that there are different types of augmented reality displays. A user wearing a see-through, augmented reality personal A/V apparatus actually sees with his or her natural sight a real object, which is not occluded by image data of a virtual object or virtual effects, in a display field of view of the see-through display, hence the names see-through display and optical see-through display. For other types of augmented reality displays like video-see displays, sometimes referred to as video see-through displays, or a display operating in a video-see mode, the display is not really see-through, because the user does see real objects with his natural sight but is displayed image data of unoccluded real objects as they would appear with natural sight as well as image data of virtual objects and virtual effects. References to a see-through display below is in reference to an optical see-through display.

The term "display field of view" refers to the field of view of the display portion of the display device system as the display portion is what the user looks through. In other words, the display field of view approximates a user field of view as seen from a user perspective which is where a user is looking from. The term user perspective includes approximations of a user perspective with varying degrees of accuracy. For example, the user perspective may be determined using parameters without regard to specific eye data for a specific user. In other examples, more sophisticated techniques may use individual gaze determined from eye tracking data to more precisely pinpoint from where a user is looking.

In some embodiments, a user perspective of an object, real or virtual, is determined from a position and orientation of the object in the display field of view. The display field of view can be defined in terms of a view dependent coordinate system. The view dependent coordinate system moves with the display as the user's head moves. (A 3D mapping of a physical location using a view independent coordinate system has a fixed origin in the physical location.) In some embodiments, the display field of view may be approximated by a view dependent coordinate system, having orthogonal X, Y and Z axes in which a Z-axis represents a depth position from a reference point on the front of the personal A/V apparatus or one or more points determined in relation to the front of the personal A/V apparatus like an approximate location for the user's foveae.

FIG. 1A is a block diagram depicting example components of an embodiment of a personal audiovisual (A/V) apparatus 8. Personal A/V apparatus 8 includes an optical see-through, augmented reality display device as a near-eye, augmented reality display device 2 in communication with a companion processing module 4 via a wire 6 in this example or wirelessly in other examples. In this embodiment, head mounted display device 2 is in the shape of eyeglasses in a frame 115, with a display optical system 14, 14r and 14l, for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through, meaning optical see-through, augmented reality display 14.

Frame 115 provides a support structure for holding elements of the apparatus in place as well as a conduit for electrical connections. In this embodiment, frame 115 provides a convenient eyeglass frame as support for the elements of the apparatus discussed further below. Some other example of a near-eye support structure are a visor frame or a goggles support. The frame 115 includes a nose bridge 104 with a microphone 110 for recording sounds and transmitting audio data to control circuitry 136. A side arm or temple 102 of the frame rests on each of a user's ears, and in this example the temple 102 is illustrated as including control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing capture devices 113, e.g. cameras, for recording digital image data such as still images, videos or both, and transmitting the visual recordings to the control circuitry 136 which may in turn send the captured image data to the companion processing module 4 which may also send the data to one or more computer systems 12 or to another personal A/V apparatus over one or more communication networks 50.

The companion processing module 4 may take various embodiments. In some embodiments, companion processing module 4 is a separate unit which may be worn on the user's body, e.g. a wrist, or be a separate device like a mobile device (e.g. smartphone). The companion processing module 4 may communicate wired or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 50 to one or more computer systems 12 whether located nearby or at a remote location, other personal A/V apparatus 8 in a location or environment, for example as part of peer-to-peer communication, and if available, one or more 3D image capture devices 20 in the environment. In other embodiments, the functionality of the companion processing module 4 may be integrated in software and hardware components of the display device 2 as in FIG. 1B. Some examples of hardware components of the companion processing module 4 are shown in FIG. 11. One or more network accessible computer system(s) 12 may be leveraged for processing power and remote data access. An example of hardware components of a computer system 12 is shown in FIG. 11. The scale and number of components may vary considerably for different embodiments of the computer system 12 and the companion processing module 4.

An application may be executing on a computer system 12 which interacts with or performs processing for an application executing on one or more processors in the personal A/V apparatus 8. For example, a 3D mapping application may be executing on the one or more computers systems 12 and the user's personal A/V apparatus 8. In some embodiments, the application instances may perform in a master and client role in which a client copy is executing on the personal A/V apparatus 8 and performs 3D mapping of its display field of view, receives updates of the 3D mapping from the computer system(s) 12 including updates of objects in its view from the master 3D mapping application and sends image data, and depth and object identification data, if available, back to the master copy. Additionally, in some embodiments, the 3D mapping application executing on different personal A/V apparatus 8 in the same environment share data updates in real time, for example real object identifications in a peer-to-peer configuration between apparatus 8.

In the illustrated embodiments of FIGS. 1A and 1B, the one or more computer system 12 and the personal A/V apparatus 8 also have network access to one or more 3D image capture devices 20 which may be, for example one or more cameras that visually monitor one or more users and the surrounding space such that gestures and movements performed by the one or more users, as well as the structure of the surrounding space including surfaces and objects, may be captured, analyzed, and tracked. Image data, and depth data if captured, of the one or more 3D capture devices 20 may supplement data captured by one or more capture devices 113 on the near-eye, AR display device 2 of the personal A/V apparatus 8 and other personal A/V apparatus 8 in a location for 3D mapping, gesture recognition, object recognition, resource tracking, and other functions as discussed further below.

The one or more capture devices 20 may be one or more depth cameras positioned in a user environment. According to an example embodiment, each capture device 20 may be configured with RGB and IR components to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight. The depth image may include a two-dimensional (2-D) pixel area of the captured field of view where each pixel in the 2-D pixel area may represent a length in, for example, centimeters, millimeters, or the like of an object in the captured field of view from the camera.

FIG. 1B is a block diagram depicting example components of another embodiment of a personal audiovisual (A/V) apparatus having a near-eye augmented reality display which may communicate over a communication network 50 with other devices. In this embodiment, the control circuitry 136 of the display device 2 incorporates the functionality which a companion processing module 4 provides in FIG. 1A and communicates wirelessly via a wireless transceiver (see wireless interface 137 in FIG. 2A) over a communication network 50 to one or more computer systems 12 whether located nearby or at a remote location, other personal A/V apparatus 8 in a location or environment and, if available, a 3D image capture device in the environment.

FIG. 2A is a side view of an eyeglass temple 102 of a frame in an embodiment of the personal audiovisual (A/V) apparatus having an optical see-through, augmented reality display embodied as eyeglasses providing support for hardware and software components. At the front of frame 115 is depicted one of at least two physical environment facing capture devices 113, e.g. cameras, that can capture image data like video and still images, typically in color, of the real world to map real objects in the display field of view of the see-through display, and hence, in the field of view of the user.

In some examples, the capture devices 113 may also be depth sensitive, for example, they may be depth sensitive cameras which transmit and detect infrared light from which depth data may be determined. In other examples, a separate depth sensor (not shown) on the front of the frame 115 may also capture and provide depth data to objects and other surfaces in the display field of view. The depth data and image data form a depth map of the captured field of view of the capture devices 113 which are calibrated to include the display field of view. A three dimensional (3D) mapping of the display field of view can be generated based on the depth map. Some examples of depth sensing technologies that may be included on the head mounted display device 2 without limitation, are SONAR, LIDAR, Structured Light, and/or Time of Flight.

In some embodiments, the outward facing capture devices 113 provide overlapping image data from which depth information for objects in the image data may be determined based on stereopsis. Parallax and contrasting features such as color may also be used to resolve relative positions of real objects.

The capture devices 113 are also referred to as outward facing capture devices meaning facing outward from the user's head. The illustrated capture device 113 is a front facing capture device which is calibrated with respect to a reference point of its respective display optical system 14. One example of such a reference point is an optical axis (see 142 in FIG. 2B) of its respective display optical system 14. The calibration allows the display field of view of the display optical systems 14 to be determined from the data captured by the capture devices 113.

Control circuitry 136 provide various electronics that support the other components of head mounted display device 2. In this example, the right temple 102 includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU), particularly in embodiments without a separate companion processing module 4, which contains at least one graphics processing unit (GPU).

Inside, or mounted to temple 102, are an earphone of a set of earphones 130, an inertial sensing unit 132 including one or more inertial sensors, and a location sensing unit 144 including one or more location or proximity sensors, some examples of which are a GPS transceiver, an infrared (IR) transceiver, or a radio frequency transceiver for processing RFID data. In one embodiment, inertial sensing unit 132 includes a three axis magnetometer, a three axis gyro, and a three axis accelerometer as inertial sensors. The inertial sensors are for sensing position, orientation, and sudden accelerations of head mounted display device 2. From these sensed movements, head position, and thus orientation of the display device, may also be determined which indicate changes in the user perspective and the display field of view for which virtual data is updated to track with the user perspective.

In this embodiment, each of the devices processing an analog signal in its operation include control circuitry which interfaces digitally with the digital processing unit 210 and memory 244 and which produces or converts analog signals, or both produces and converts analog signals, for its respective device. Some examples of devices which process analog signals are the sensing units 144, 132, and earphones 130 as well as the microphone 110, capture devices 113 and a respective IR illuminator 134A, and a respective IR detector or camera 134B for each eye's display optical system 14*l*, 14*r* discussed below.

Mounted to or inside temple 102 is an image source or image generation unit 120 which produces visible light representing images. The image generation unit 120 can display a virtual object to appear at a designated depth location in the display field of view to provide a realistic, in-focus three dimensional display of a virtual object which can interact with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 8, 2010 and "Automatic Focus Improvement for Augmented Reality Displays," having U.S. patent application Ser. No. 12/949,650 and inventors Avi Bar-Zeev and John Lewis, and which was filed Nov. 18, 2010. In these examples, a focal length for an image generated by the image generation unit 120 is changed by adjusting a displacement between an image source such as a microdisplay and at least one optical element like a lens or by adjusting the optical power of an optical element which receives the light representing the image. The change in focal length results in a change in a region of the display field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In some embodiments, the image generation unit 120 includes a microdisplay for projecting images of one or more virtual objects and coupling optics like a lens system for directing images from the microdisplay to a reflecting surface or element 124. The reflecting surface or element 124 directs the light from the image generation unit 120 into a light guide optical element 112, which directs the light representing the image into the user's eye.

FIG. 2B is a top view of an embodiment of one side of an optical see-through, near-eye, augmented reality display device including a display optical system 14. A portion of the frame 115 of the near-eye display device 2 will surround a display optical system 14 for providing support and making electrical connections. In order to show the components of the display optical system 14, in this case 14*r* for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, light guide optical element 112 for projecting image data from the image generation unit 120 is behind and aligned with opacity filter 114, and optional see-through lens 118 is behind and aligned with light guide optical element 112.

Light guide optical element 112 transmits light from image generation unit 120 to the eye 140 of the user wearing head mounted, display device 2. Light guide optical element 112 also allows light from in front of the head mounted, display device 2 to be received through light guide optical element 112 by eye 140, as depicted by an arrow representing an optical axis 142 of the display optical system 14r, thereby allowing the user to have an actual direct view of the space in front of head mounted, display device 2 in addition to receiving a virtual image from image generation unit 120. Thus, the walls of light guide optical element 112 are see-through. In this embodiment, light guide optical element 112 is a planar waveguide. A representative reflecting element 134E represents the one or more optical elements like mirrors, gratings, and other optical elements which direct visible light representing an image from the planar waveguide towards the user eye 140.

Infrared illumination and reflections, also traverse the planar waveguide for an eye tracking system 134 for tracking the position and movement of the user's eye, typically the user's pupil. Eye movements may also include blinks. The tracked eye data may be used for applications such as gaze detection, blink command detection and gathering biometric information indicating a personal state of being for the user. The eye tracking system 134 comprises an eye tracking IR illumination source 134A (an infrared light emitting diode (LED) or a laser (e.g. VCSEL)) and an eye tracking IR sensor 134B (e.g. IR camera, arrangement of IR photodetectors, or an IR position sensitive detector (PSD) for tracking glint positions). In this embodiment, representative reflecting element 134E also implements bidirectional infrared (IR) filtering which directs IR illumination towards the eye 140, preferably centered about the optical axis 142 and receives IR reflections from the user eye 140. In some examples, as part of the integrated eye tracking and display system, representative reflecting element 134E may include a hot mirror or gratings for implementing the bidirectional IR filtering. A wavelength selective filter 134C passes through visible spectrum light from the reflecting surface or element 124 and directs the infrared wavelength illumination from the eye tracking illumination source 134A into the planar waveguide. Wavelength selective filter 134D passes the visible light and the infrared illumination in an optical path direction heading towards the nose bridge 104. Wavelength selective filter 134D directs infrared radiation from the waveguide including infrared reflections of the user eye 140, preferably including reflections captured about the optical axis 142, out of the light guide optical element 112 embodied as a waveguide to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Opacity filter 114, which is aligned with light guide optical element 112, selectively blocks natural light from passing through light guide optical element 112 for enhancing contrast of virtual imagery. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

Again, FIGS. 2A and 2B show half of the head mounted display device 2. For the illustrated embodiment, a full head mounted display device 2 may include another display optical system 14 with another set of optional see-through lenses 116 and 118, another opacity filter 114, another light guide optical element 112, as well as another image generation unit 120, another physical environment facing capture device 113, eye tracking system 134, and another earphone 130. In some embodiments, there may be a continuous display viewed by both eyes, rather than a display optical system for each eye. Additional details of a head mounted personal A/V apparatus are illustrated in U.S. patent application Ser. No. 12/905,952 entitled Fusing Virtual Content Into Real Content, Filed Oct. 15, 2010, fully incorporated herein by reference.

FIG. 3A is a block diagram of a system from a software perspective for representing a physical location at a previous time period with three dimensional (3D) virtual data being displayed by a near-eye, augmented reality display of a personal audiovisual (A/V) apparatus. FIG. 3A illustrates a computing environment embodiment 54 from a software perspective which may be implemented by a system like physical A/V apparatus 8, one or more remote computer systems 12 in communication with one or more physical A/V apparatus or a combination of these. Additionally, physical A/V apparatus can communicate with other physical A/V apparatus for sharing data and processing resources. Network connectivity allows leveraging of available computing resources. An information display application 414 may be executing on one or more processors of the personal A/V apparatus 8. In the illustrated embodiment, a virtual data provider system 404 executing on a remote computer system 12 can also be executing a version of the information display application 414 as well as other personal A/V apparatus 8 with which it is in communication. As shown in the embodiment of FIG. 3A, the software components of a computing environment 54 comprise an image and audio processing engine 191 in communication with an operating system 190. Image and audio processing engine 191 processes image data (e.g. moving data like video or still), and audio data in order to support applications executing for a head mounted display (HMD) device system like a physical A/V apparatus 8 including a near-eye, augmented reality display. Image and audio processing engine 191 includes object recognition engine 192, gesture recognition engine 193, virtual data engine 195, eye tracking software 196 if eye tracking is in use, an occlusion engine 302, a 3D positional audio engine 304 with a sound recognition engine 194, a scene mapping engine 306, and a physics engine 308 which may communicate with each other.

The computing environment 54 also stores data in image and audio data buffer(s) 199. The buffers provide memory for receiving image data captured from the outward facing capture devices 113, image data captured by other capture devices if available, image data from an eye tracking camera of an eye tracking system 134 if used, buffers for holding image data of virtual objects to be displayed by the image generation units 120, and buffers for both input and output audio data like sounds captured from the user via microphone 110 and sound effects for an application from the 3D audio engine 304 to be output to the user via audio output devices like earphones 130.

Image and audio processing engine 191 processes image data, depth data and audio data received from one or more capture devices which may be available in a location. Image and depth information may come from the outward facing capture devices 113 captured as the user moves his head or body and additionally from other physical A/V apparatus 8, other 3D image capture devices 20 in the location and image data stores like location indexed images and maps 324.

The individual engines and data stores depicted in FIG. 3A are described in more detail below, but first an overview of the data and functions they provide as a supporting platform is described from the perspective of an application like an information display application 414 which provides virtual data associated with a physical location. An information display application 414 executing in the near-eye, augmented reality physical A/V apparatus 8 or executing remotely on a computer system 12 for the physical A/V apparatus 8 leverages the various engines of the image and audio processing engine 191 for implementing its one or more functions by sending requests identifying data for processing and receiving notification of data updates. For example, notifications from the scene mapping engine 306 identify the positions of virtual and real objects at least in the display field of view. The information display application 414 identifies data to the virtual data engine 195 for generating the structure and physical properties of an object for display. The information display application 414 may supply and identify a physics model for each virtual object generated for its application to the physics engine 308, or the physics engine 308 may generate a physics model based on an object physical properties data set 320$_N$ for the object.

The operating system 190 makes available to applications which gestures the gesture recognition engine 193 has identified, which words or sounds the sound recognition engine 194 has identified, the positions of objects from the scene mapping engine 306 as described above, and eye data such as a position of a pupil or an eye movement like a blink sequence detected from the eye tracking software 196. A sound to be played for the user in accordance with the information display application 414 can be uploaded to a sound library 312 and identified to the 3D audio engine 304 with data identifying from which direction or position to make the sound seem to come from. The device data 198 makes available to the information display application 414 location data, head position data, data identifying an orientation with respect to the ground and other data from sensing units of the display device 2.

The scene mapping engine 306 is first described. A 3D mapping of the display field of view of the augmented reality display can be determined by the scene mapping engine 306 based on captured image data and depth data, either derived from the captured image data or captured as well. The 3D mapping includes 3D space positions or position volumes for objects. A 3D space is a volume of space occupied by the object. Depending on the precision desired, the 3D space can match the 3D shape of the object or be a less precise bounding volume around an object like a bounding box, a bounding 3D elliptical shaped volume, a bounding sphere or a bounding cylinder. A 3D space position represents position coordinates for the boundary of the volume or 3D space. In other words the 3D space position identifies how much space an object occupies and where in the display field of view that occupied space is.

A depth map representing captured image data and depth data from outward facing capture devices 113 can be used as a 3D mapping of a display field of view of a near-eye AR display. As discussed above, a view dependent coordinate system may be used for the mapping of the display field of view approximating a user perspective. The captured data may be time tracked based on capture time for tracking motion of real objects. Virtual objects can be inserted into the depth map under control of an application like information display application 414. Mapping what is around the user in the user's environment can be aided with sensor data. Data from an orientation sensing unit 132, e.g. a three axis accelerometer and a three axis magnetometer, determines position changes of the user's head and correlation of those head position changes with changes in the image and depth data from the front facing capture devices 113 can identify positions of objects relative to one another and at what subset of an environment or location a user is looking.

Depth map data of another HMD device, currently or previously in the environment, along with position and head orientation data for this other HMD device can also be used to map what is in the user environment. Shared real objects in their depth maps can be used for image alignment and other techniques for image mapping. With the position and orientation data as well, what objects are coming into view can be predicted as well so physical interaction processing, occlusion and other processing can start even before the objects are in view.

The scene mapping engine 306 can also use a view independent coordinate system for 3D mapping, and a copy of a scene mapping engine 306 may be in communication with other scene mapping engines 306 executing in other systems (e.g. 12 and 8) so the mapping processing can be shared. The map can be stored in the view independent coordinate system in a storage location (e.g. 324) accessible as well by other physical A/V apparatus 8, other computer systems 12 or both, be retrieved from memory and be updated over time as one or more users enter or re-enter the environment.

In some embodiments, a scene mapping engine 306 executing on one or more network accessible computer systems 12 updates a centrally stored 3D mapping of a location and apparatus 8 download updates and determine changes in objects in their respective display fields of views based on the map updates. Image and depth data from multiple perspectives can be received in real time from other 3D image capture devices 20 under control of one or more network accessible computer systems 12 or from one or more physical A/V apparatus 8 in the location. Overlapping subject matter in the depth images taken from multiple perspectives may be correlated based on a view independent coordinate system, and the image content combined for creating the volumetric or 3D mapping of a location (e.g. an x, y, z representation of a room, a store space, or a geofenced area). Additionally, the scene mapping engine 306 can correlate the received image data based on capture times for the data in order to track changes of objects and lighting and shadow in the location in real time.

The registration and alignment of images allows the scene mapping engine to be able to compare and integrate real-world objects, landmarks, or other features extracted from the different images into a unified 3-D map associated with the real-world location. (For more information on collaborative scene mapping between HMDs like apparatus 8 and computer systems 12 with access to image data, see "Low-Latency Fusing of Virtual and Real Content," having U.S. patent application Ser. No. 12/912,937 having inventors Avi Bar-Zeev et al. and filed Oct. 27, 2010 and which is hereby incorporated by reference.)

When a user enters a location or an environment within a location, the scene mapping engine 306 may first search for a pre-generated 3D map identifying 3D space positions and identification data of objects stored locally or accessible from another physical A/V apparatus 8 or a network accessible computer system 12. The pre-generated map may include stationary objects. The pre-generated map may also include objects moving in real time and current light and shadow conditions if the map is presently being updated by another scene mapping engine 306 executing on another computer system 12 or apparatus 8. For example, a pre-generated map indicating positions, identification data and physical properties of stationary objects in a user's living room derived from image and depth data from previous HMD sessions can be retrieved from memory. Additionally, identification data including physical properties for objects which tend to enter the location can be preloaded for faster recognition. A pre-generated map may also store physics models for objects as discussed below. A pre-generated map may be stored in a network accessible data store like location indexed images and 3D maps 324.

The location may be identified by location data which may be used as an index to search in location indexed image and pre-generated 3D maps 324 or in Internet accessible images 326 for a map or image related data which may be used to generate a map. For example, location data such as GPS data from a GPS transceiver of the location sensing unit 144 on the display device 2 may identify the location of the user. In another example, a relative position of one or more objects in image data from the outward facing capture devices 113 of the user's physical A/V apparatus 8 can be determined with respect to one or more GPS tracked objects in the location from which other relative positions of real and virtual objects can be identified. Additionally, an IP address of a WiFi hotspot or cellular station to which the physical A/V apparatus 8 has a connection can identify a location. Additionally, identifier tokens may be exchanged between physical A/V apparatus 8 via infra-red, Bluetooth or WUSB. The range of the infra-red, WUSB or Bluetooth signal can act as a pre-defined distance for determining proximity of another user. Maps and map updates, or at least object identification data may be exchanged between physical A/V apparatus via infra-red, Bluetooth or WUSB as the range of the signal allows.

The scene mapping engine 306 identifies the position and tracks the movement of real and virtual objects in the volumetric space based on communications with the object recognition engine 192 of the image and audio processing engine 191 and one or more executing applications generating virtual objects.

The object recognition engine 192 of the image and audio processing engine 191 detects, tracks and identifies real objects in the display field of view and the 3D environment of the user based on captured image data and captured depth data if available or determined depth positions from stereopsis. The object recognition engine 192 distinguishes real objects from each other by marking object boundaries and comparing the object boundaries with structural data. One example of marking object boundaries is detecting edges within detected or derived depth data and image data and connecting the edges. A polygon mesh may also be used to represent the object's boundary. The object boundary data is then compared with stored structure data in order to identify a type of object within a probability criteria. Besides identifying the type of object, an orientation of an identified object may be detected based on the comparison with stored structure data 200, object reference data sets 318 or both. One or more databases of structure data 200 accessible over one or more communication networks 50 may include structural information about objects. As in other image processing applications, a person can be a type of object, so an example of structure data is a stored skeletal model of a human which may be referenced to help recognize body parts. Structure data 200 may also include structural information regarding one or more inanimate objects in order to help recognize the one or more inanimate objects, some examples of which are furniture, sporting equipment, automobiles and the like.

The structure data 200 may store structural information as image data or use image data as references for pattern recognition. The image data may also be used for facial recognition. The object recognition engine 192 may also perform facial and pattern recognition on image data of the objects based on stored image data from other sources as well like user profile data 197 of the user, other users profile data 322 which are permission and network accessible, location indexed images and 3D maps 324 and Internet accessible images 326. Motion capture data from image and depth data may also identify motion characteristics of an object. The object recognition engine 192 may also check detected properties of an object against reference properties of an object like its size, shape and motion characteristics. An example of such a set of reference properties for an object is an object reference data set as stored in objects reference data sets 318.

Figure 3B:
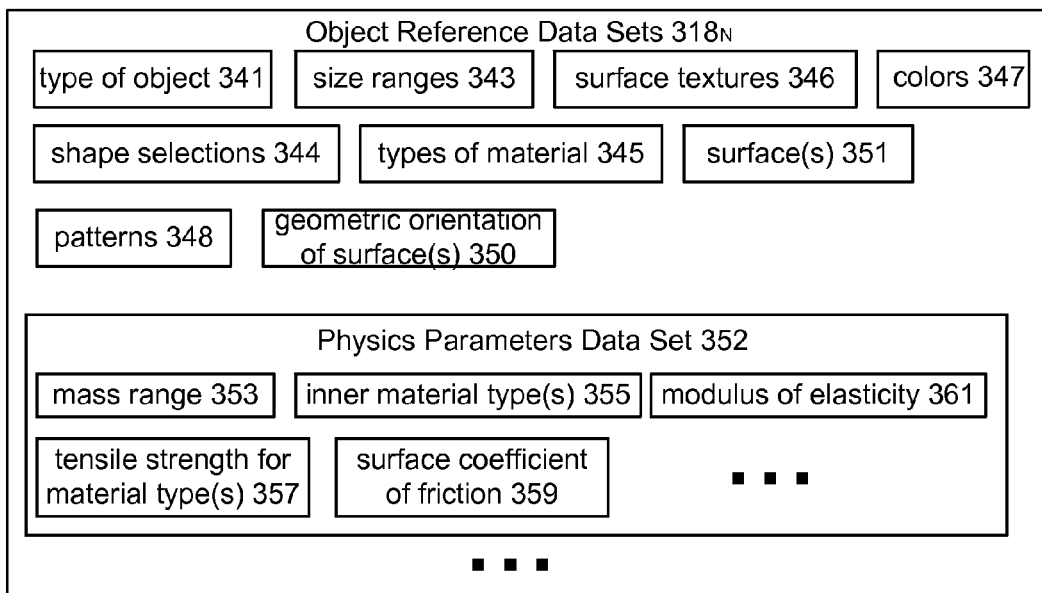
FIG. 3B illustrates an example of an object reference data set.

FIG. 3B illustrates an example of an object reference data set 318N with some examples of data fields which the data set may include. The object reference data sets 318 available to the object recognition engine 192 may have been predetermined manually offline by an application developer or by pattern recognition software and stored. Additionally, if a user takes inventory of an object by viewing it with the physical A/V apparatus 8 and inputting data for the data fields, an object reference data set is generated. Also, object reference data sets can be created and stored for sharing with other users as indicated in share permissions. Furthermore, the object recognition engine 192 can search accessible user profile data 197, 322 for information on objects in an environment. An example of such information is purchase data with product identifiers which can then be searched by the object recognition engine 192 in order to locate product descriptions with more details, for example in online catalog entries and product sites. The image data of the object may also be a basis for image searching for more descriptive data as may be found in metadata to fill in the data fields. This allows for more detailed object reference data sets 318.

Particularly, for an object recognition engine executing on one or more network accessible computer systems 12 with access to multiple users profile data 322 and more extensive computing and storage resources, such searching can be done in the background. Over time as the library or database of object reference data sets 318 grows, objects are recognized more quickly. In some embodiments, the object recognition engine 192 can automatically update data for a type of object data set and also automatically create a new data set for a previously unidentified type of object. In some examples implementing automatic update and automatic generation of new data sets, the object recognition engine 192 can display a message to the user or a database manager indicating additional data is available for a type of object or a previously unknown type of object in order to obtain permission before automatically generating the set. Either the user or the database manager can grant permission to update an existing data set or create and store a new one.

The data fields described below are representative examples and are not intended to be all inclusive. Furthermore, there may be a data set for a general type of object, like chair or car, and then data sets for specific types of chairs or cars. For example, a data set may include a base class object of chair and then sub-classes of chaise-lounge, folding chair, etc. with additional data fields for describing additional features specific to the sub-class. The illustrated data fields include a type of object 341 which may be a data record which also includes sub-fields. For the type of object 341, the other data fields provide data records identifying the types of physical properties available for the type of object. The other examples of data records include size ranges 343, shape selections available 344, typical types of material 345, colors available 347, patterns available 348, surface(s) available 351, typical surface texture(s) 346, and a geometric orientation 350 of each available surface 351.

There may also be stored a physics parameters data set 352 for each object reference data set 318N. The example physics parameters include a mass range 353 for the type of object 341, one or more inner material type(s) 355, a modulus of elasticity 361 for use with Hooke's Law, one or more tensile strengths associated with one or more material types 357 including at least a surface material type, and a surface coefficient of friction 359 associated with the surface material. Air may be considered a type of inner material. These parameters may be selected for a physics model representing an object for use by a physics engine 308 as discussed below.

Figure 3C:
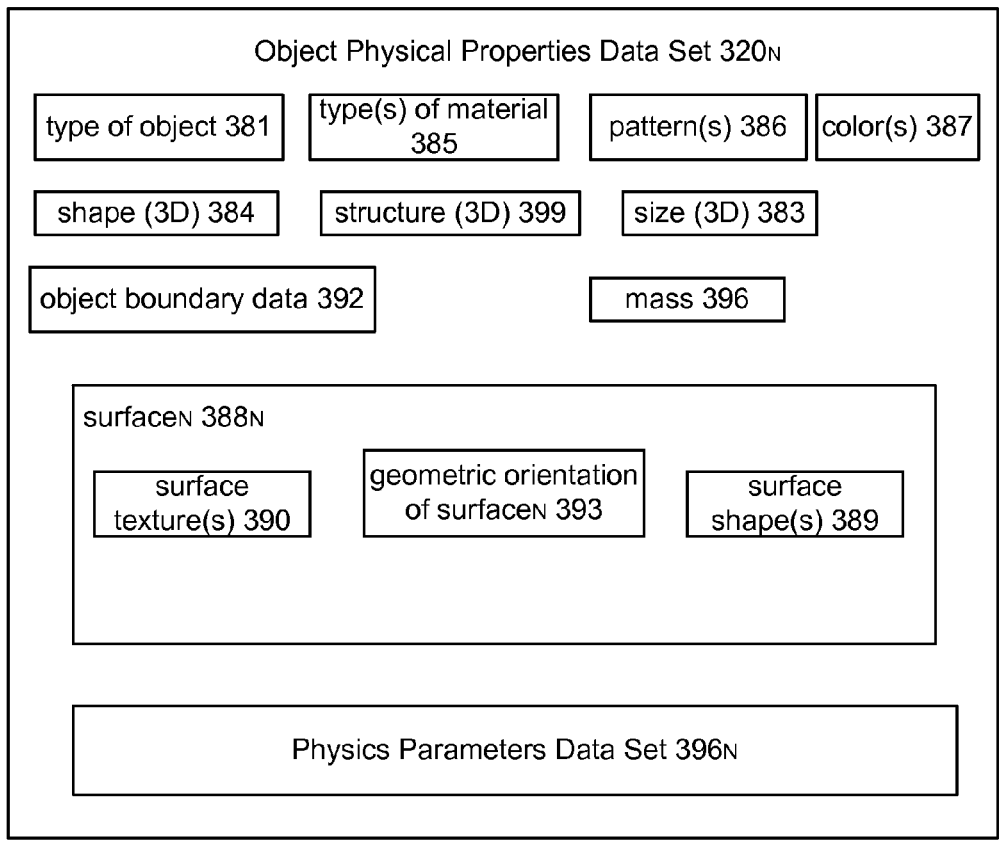
FIG. 3C illustrates some examples of data fields in an object physical properties data set.

FIG. 3C illustrates some examples of data fields in an object physical properties data set 320N stored for an object. For a real object, at least some of the data values for the data fields are determined based on captured image data, depth data or both of the real object. For a virtual object, the data values for the data fields may be data provided by the application which controls the virtual object. Again, the data fields described below are representative examples and are not intended to be all inclusive. The example data fields include a type of object 381, size 383, in three dimensions in this example, shape 384, also 3D in this example, structure 399 (e.g. skeletal or for an inanimate object), also in three dimensions in this example, object boundary data 392, such as for example the determined edge data or a polygon mesh for a real object or the boundary data of a virtual object, mass 396, and type(s) of material 385. For a real object, a type of surface material may be determined based on captured image data, and the types of inner material determined based on an object reference data set 318N or other object reference data source like 197, 322, 324, and 326. Some other exemplary data fields include pattern(s) 386 and colors 387 as well as surface(s) 388N.

Surface 388N represents an exemplary data set for each surface identified. The data set includes one or more surface textures 390, a geometric orientation 393 of the surfaceN, and a surface shape 389 (e.g. flat, round, curvy, uneven, etc.).

For real objects, data is assigned to each of these data fields based on a weighted probability by the object recognition engine 192 as it detects object boundary data and colors and derives shapes and surfaces and looks up object reference data. These different properties are then weighted, and a probability is assigned whether an object in the image data is a certain type of object, and if the probability satisfies a criteria for a certain type of object, that type of object is assigned as the type of object 381 The object physical properties data set 320N is then stored in one or more network accessible data stores 320. A physics parameter data set 396N with data fields like those in the corresponding data set 352, but with values for the specific real or virtual object, is also included in the object physical properties data set 320N. These are assigned by an application or the physics engine for virtual objects. For real objects, the physics data fields can be determined from object reference data sources based on the type of object 381 and physical properties determined by the object recognition engine 192.

The scene mapping engine 306 and the object recognition engine 192 exchange data which assist each engine in its functions. For example, based on an object identification and orientation determined by the object recognition engine 192, the scene mapping engine 306 can update a 3D space position or position volume for an object for more accuracy. For example, a chair on its side has different position coordinates for its volume than when it is right side up. A position history or motion path identified from position volumes updated for an object by the scene mapping engine 306 can assist the object recognition engine 192 track an object, particularly when it is being partially occluded.

Upon detection of one or more objects by the object recognition engine 192, image and audio processing engine 191 may report to operating system 190 an identification of each object detected and a corresponding position and orientation which the operating system 190 passes along to other executing applications like the scene mapping engine 306, the occlusion engine 302, the physic engine 308 and other upper level applications 166 like the information display application 414.

The occlusion engine 302 identifies spatial occlusions between objects, and in particular between real and virtual objects based on spatial position data for recognized objects within a coordinate system as updated by the objection recognition engine 192 and the scene mapping engine 306. As virtual and real objects have size and shape, a 3D space position for each object may be defined by the scene mapping engine to incorporate the volume occupied by each object. In the case of complete occlusion of a virtual object by a real object, the occlusion engine can notify the virtual data engine to not display the virtual object. In the case of complete occlusion of the real object by the virtual object, the virtual object or its parts can be sized to completely cover the real object and its parts. In some embodiments, for partial occlusion of a virtual object by a real object, an unoccluded portion of the virtual object is displayed. In some embodiments, for partial of a real object by a virtual object, the virtual object is displayed to appear in front of the occluded part of the real object. In some embodiments, like that of FIG. 2B, the opacity filter 114 can be set to limit light coming in through the see-through display 14 for the display portion which projects the partially occluding, or a wholly occluding virtual object. For more information about occlusion processing, see U.S. patent application Ser. No. 12/905,952 entitled "Fusing Virtual Content into Real Content," Flaks et al., and filed Oct. 15, 2010, which is hereby incorporated by reference and see also U.S. patent application Ser. No. 13/443,368 entitled "Realistic Occlusion for a Head Mounted Augmented Reality Display" Geisner et al., and filed Apr. 10, 2012, which is hereby incorporated by reference.

The 3D audio engine 304 is a positional 3D audio engine which receives input audio data and outputs audio data for the earphones 130 or other audio output devices like speakers in other embodiments. The received input audio data may be for a virtual object or be that generated by a real object. Audio data for virtual objects generated by an application or selected from a sound library 312 can be output to the earphones to sound as if coming from the direction of the virtual object. An example of a positional 3D audio engine which may be used with an augmented reality system is disclosed in U.S. patent application Ser. No. 12/903,610 entitled "System and Method for High-Precision 3-Dimensional Audio for Augmented Reality," to Flaks et al., and filed Oct. 13, 2010, which is hereby incorporated by reference.

Sound recognition engine 194 of the 3D audio engine identifies audio data from the real world received via microphone 110 for application control via voice commands and for environment and object recognition. Based on a sound library 312, the engine 304 can identify a sound with a physical object, e.g. a horn sound associated with a certain make or model of car. Additionally, voice data files stored in user profile data 197 or user profiles 322 may also identify a speaker with whom a person object mapped in the environment may be associated. In addition to uploading their image data, physical A/V apparatus 8 and 3D image capture devices 20 in a location may upload their captured audio data to a network accessible computer system 12 to be associated with objects in the 3D mapping by the scene mapping engine 306. For example, a stored 3D map of a location can provide an audio index of sounds of objects fixed in the location or which enter and leave the location on a regular basis, e.g. train and bus sounds.

An embodiment of a natural user interface (NUI) in one or more embodiments of the physical A/V apparatus 8 may include the outward facing capture devices 113 and the gesture recognition engine 193 for identifying a gesture which is an example of at least one user physical action of at least one body part. The eye tracking system 134 and the eye tracking software 196 for interpreting eye movements based on the data captured by the system 134 may also be components in another embodiment of a natural user interface for the physical A/V apparatus 8. Eye based actions like a blink sequence indicating a command, a gaze pattern, or gaze duration identified by the eye tracking software 196 are also some examples of user input as one or more user physical actions of at least one body part. The microphone and sound recognition engine 194 can also process natural user input of voice commands which may also supplement other recognized physical actions such as gestures and eye gaze.

The gesture recognition engine 193 can identify actions performed by a user indicating a control or command to an executing application. The action may be performed by a body part of a user, e.g. a hand or finger, but also an eye blink sequence of an eye can be a gesture. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, matching of image data to image models of a user's hand or finger during gesture training sessions may be used rather than skeletal tracking for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The physics engine 308 simulates the physics of motion of objects and the exchange of energy between objects as forces are applied to them based on rules governing a physical environment. In other words, the physics engine 308 helps make collisions between objects look real. The term "collision" in this specification is used in a physics sense of the word meaning a physical contact during which at least portions of different objects meet, and each object exerts a force upon the other causing an exchange of energy. In the illustrative examples discussed herein, Newton's laws of physics are used as the illustrative rules for a physical environment. An application can define different physical environment rules. For example, an environment having a different gravitational force than Earth's can be requested by inputting different environmental parameters.

Physics engine libraries 328 are used by the physics engine 308 in updating physics models and simulating actions and effects like collision effects, sound effects and visual effects. Some examples of physics engine libraries 328 are as follows. One or more materials lookup tables in the libraries 328 can be referenced by the physics engine 308 for identifying physics parameters like tensile strength and coefficients of friction for different types of materials. A pre-collision events library includes data for representing events or actions, for example a gesture, which signal or trigger a collision. For example, an object landing on a certain area in an environment may be a trigger for an explosion. An action simulator library includes software instructions for simulating movement of at least a part of an object based on input parameters of one or more physical properties. A collision effects library comprises software routines for simulating a change in at least one physical property of an object during or resulting from a collision based on different input parameters. For example, a collision effect may be a change in surface shape of an object to the collision. Other examples are different crack patterns or different breaking patterns for different materials or the same material in different orientations. The sound library 312, besides being a resource for command and object recognition based on sound, may also store audio data for sound effects to be played by the 3D audio engine 304 and which may be linked with different simulated actions, pre-collision events and collision effects. Similarly, a visual effects library may store routines for animations, highlighting, and other types of visual enhancements which may also be associated with particular actions, pre-collision events and collision effects.

The libraries 328 also store previously generated or stored virtual objects physics models and real objects physics models. Persistent object identifiers may be associated with the physics models so once a real object is recognized as a previously recognized object, the physics model can be retrieved from storage rather than regenerated to save time. Similarly, virtual objects previously registered by one or more applications, for example via a software interface like an application programming interface (API), can be retrieved from the library as well. For more information, see U.S. patent application Ser. No. 13/458,800 to inventors Daniel J. McCulloch et al. entitled "Displaying a Collision between Real and Virtual Objects," filed on Apr. 27, 2012 and which is incorporated by reference herein in its entirety.

An application like information display application 414 communicates data with the virtual data engine 195 in order for the virtual data engine 195 to display and update display of one or more virtual objects controlled by the application 166.

Virtual data engine 195 processes virtual objects and registers the 3D position and orientation of virtual objects or imagery in relation to one or more coordinate systems, for example in view dependent coordinates or in the view independent 3D map coordinates. The virtual data engine 195 determines the position of image data of a virtual object or imagery in display coordinates for each display optical system 14. Additionally, the virtual data engine 195 performs translation, rotation, and scaling operations for display of the virtual data at the correct size and perspective. A virtual data position may be dependent upon, a position of a corresponding object, real or virtual, to which it is registered. The virtual data engine 195 can update the scene mapping engine about the positions of the virtual objects processed.

The following discussion describes some example processing for updating an optical see-through, augmented reality display to position virtual objects so that they appear realistically at 3D locations determined for them in the display. In one example implementation of updating the 3D display, the virtual data engine 195 renders the previously created three dimensional model of the display field of view including depth data for both virtual and real objects in a Z-buffer. The real object boundaries in the Z-buffer act as references for where the virtual objects are to be three dimensionally positioned in the display as the image generation unit 120 displays the virtual objects but not real objects as the display device is an optical see-through display device. For a virtual object, the virtual data engine 195 has a target 3D space position of where to insert the virtual object. In some examples, the virtual object target position is registered to a position of a real world object, and in other examples, the virtual object is independent of a particular real object.

A depth value is stored for each display element or a subset of display elements, for example for each pixel (or for a subset of pixels). Virtual images corresponding to virtual objects are rendered into the same z-buffer and the color information for the virtual images is written into a corresponding color buffer. The virtual images include any modifications to virtual image data based on collision processing. In this embodiment, the composite image based on the z-buffer and color buffer is sent to image generation unit 120 to be displayed at the appropriate pixels. The display update process can be performed many times per second (e.g., the refresh rate).

For a video-see, augmented reality display or operation of a see-through display in a video-see mode, image data of the real objects is also written into the corresponding color buffer with the virtual objects. The opacity filter of each see-through display optical system 14 can be tuned so that light reflected from in front of the glasses does not reach the user's eye 140 and the 3D image data of both the real and virtual objects is played on the display.

Device data 198 may include an identifier for the personal apparatus 8, a network address, e.g. an IP address, model number, configuration parameters such as devices installed, identification of the operating system, and what applications are available in the physical A/V apparatus 8 and are executing in the physical A/V apparatus 8 etc. Particularly for the see-through, augmented reality physical A/V apparatus 8, the device data may also include data from sensors or sensing units or determined from the sensors or sensing units like the orientation sensors in inertial sensing unit 132, the microphone 110, and the one or more location and proximity transceivers in location sensing unit 144.

User profile data, in a local copy 197 or stored in a cloud based user profile 322 has data for user permissions for sharing or accessing of user profile data and other data detected for the user like location tracking, objects identified which the user has gazed at, biometric data or determined states of being of the user.

Figure 4:
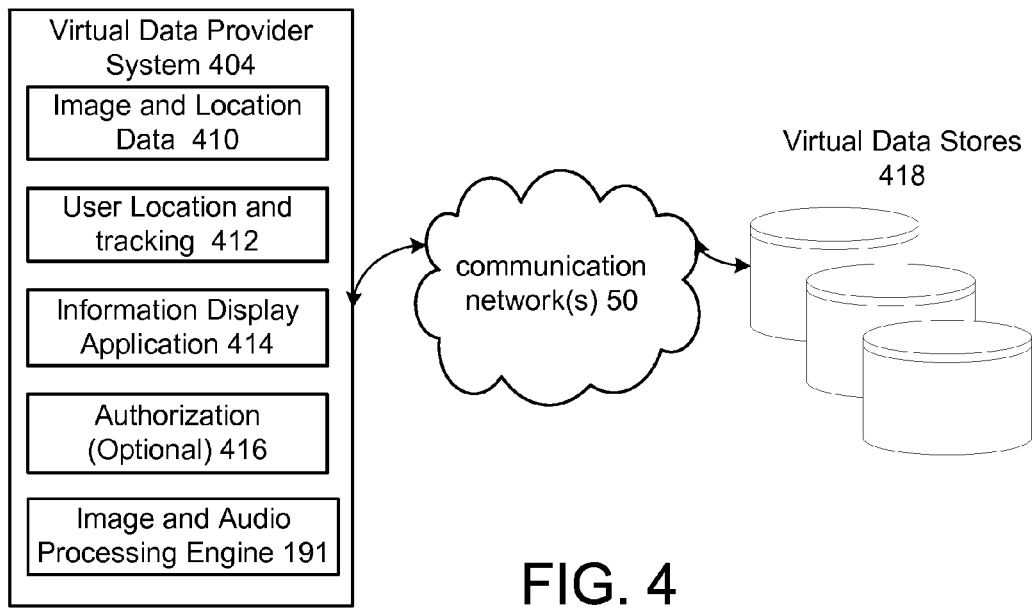
FIG. 4 is a block diagram of an embodiment of a virtual data provider system.

FIG. 4 is a block diagram of an embodiment of a virtual data provider system which shows an example architecture for one or more processes and/or software running on a virtual data provider system 404. Virtual data provider system 404 has access to virtual data stores 418 which store virtual data, including 3D virtual data. In this embodiment, at least one virtual data provider system 404 is associated with each location. Additionally, the virtual data provider system stores location data 410 for identifying its location such as GPS data, IP data or other device data which identifies its position within the location. Another type of location data 410 is image data captured of the location, and in some examples captured depth data of the location. As discussed further below, the image data of the real objects in the location is captured from a plurality of perspectives. In one embodiment, 3D image capture devices 20 are placed around the main event spaces or places of interest at the location for capturing a 360 degree view, and in some cases a 360 degree view at various heights for image data within a cylinder. Image data from capture devices 113 on different personal A/V apparatus in the vicinity of the event space or place of interest may also provide image data of unoccluded real objects.

The virtual data provider system 404 receives location data from personal A/V apparatus in the location and tracks the location, or position within a place of interest, of one or more users with a user location and tracking module 412. Virtual data is made available for download by the apparatus 8 based on one or more objects or areas around a user in a user's location. Optionally an authorization component 416 is included to authenticate the user in the location and verify the user has an electronic ticket or has paid the entrance fee based on data associated with the purchase transferred by the personal A/V apparatus.

The virtual data provider system 404 includes a version of an image and audio data processing engine 191 as a platform supporting the information display application 414 in servicing a plurality of personal A/V apparatus 8 being used throughout the place of interest. For example, a scene mapping engine 306 for the virtual data provider system tracking a view independent 3D mapping of objects, including object identifiers for users in the location, and the virtual objects and effects being displayed for them. Additionally, the virtual data engine 195 of the provider system can provide processing resources to assist the personal A/V apparatus 8 update their display fields of view more quickly. For example, the remote virtual data engine 195 can format the virtual data in a standardized holographic format which is downloaded and readily displayed by the personal A/V apparatus 8.

The information display application 414 or several of them coordinating on the provider system process requests for virtual data and image data associated with the user's current location. An example of such a request may be for a plurality of apparatus 8 to operate in a sharing mode or community mode so the users in the community may see what other users are seeing when viewing a same object or area. The information display application 414 can also customize the type of information displayed to a user and the manner in which it is displayed based on user profile data.

Figure 5:
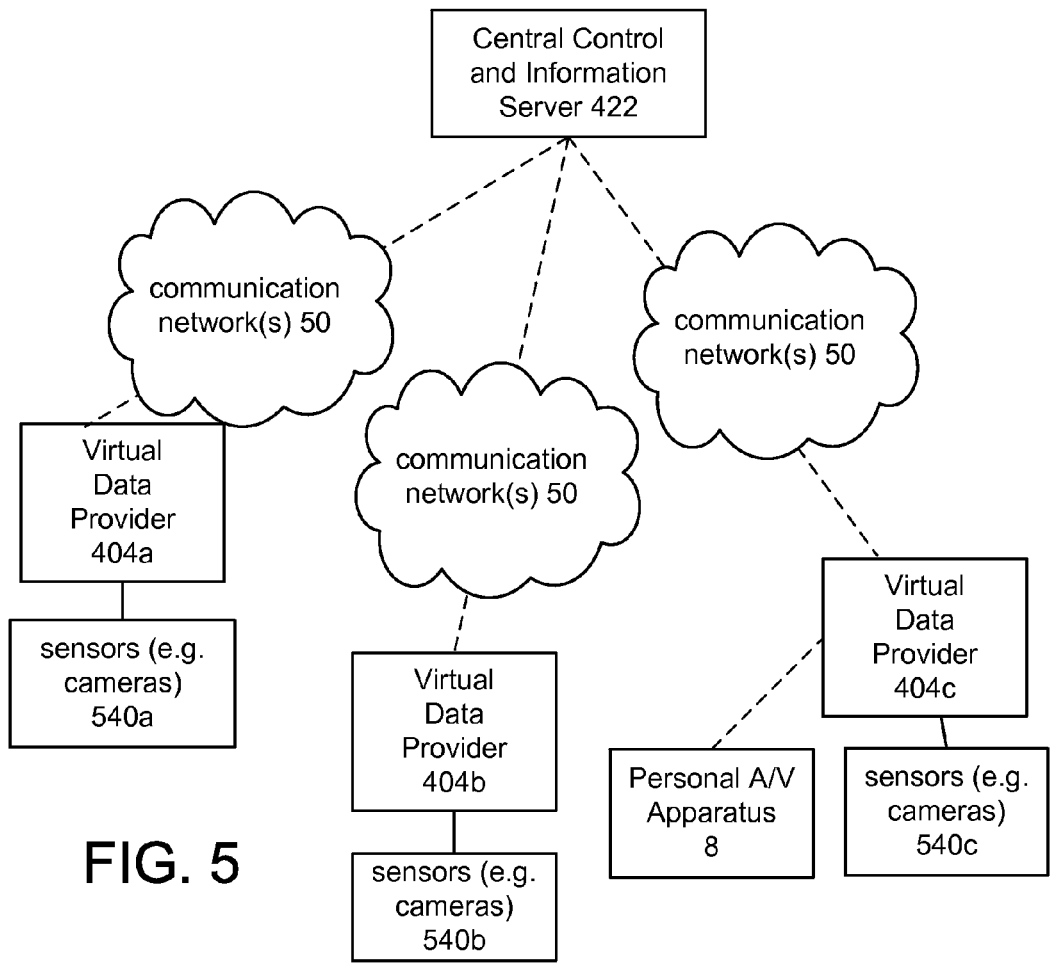
FIG. 5 is a block diagram depicting one example of a system that can be implemented at a place of interest.

FIG. 5 is a block diagram depicting one example of a system that can be implemented at a place of interest. FIG. 5 shows a Central Control and Information Server 422 (which can be one or more computing devices) in communication with a plurality of virtual data providers 404a, 404b, and 404c. In this example, each virtual data provider 404 is co-located with and communicatively coupled to a set of one or more sensors 540. The sensors can include video sensors, depth image sensors, heat sensors, IR sensors, weight sensors, motion sensors, etc. Each of the virtual data providers are placed at various locations throughout the place of interest. The respective sensors are used to track the personal A/V apparatus within the respective location and also capture image and depth data of the site throughout a day which data may be used for real time erasing of real objects as discussed below. In some examples, image data of real objects may also be layered for occluding virtual objects when video-see type devices are used. In other embodiments, sensors can be implemented without a co-located virtual data provider, where the sensors can communicate directly to Central Control and Information Server 422. The virtual data providers will communicate with the Central Control and Information Server via one or more communication networks 50 some examples of which are one or more wired networks, wireless communications or any other communication means.

The technology may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats.

For illustrative purposes, the method embodiments below are described in the context of the system embodiments described above. However, the method embodiments are not limited to operating in the system embodiments described above and may be implemented in other system embodiments. Furthermore, the method embodiments may be continuously performed while the display device is in operation and an applicable application is executing.

FIG. 6A is a flowchart of an embodiment of a method for representing a physical location at a previous time period with three dimensional (3D) virtual data displayed by a near-eye, augmented reality display of a personal A/V apparatus. In step 560, the information display application 414 automatically identifies the personal A/V apparatus is within the physical location based on location data detected by the personal A/V apparatus. For example, the information display application may identify the physical location based on GPS data stored in the device data 198. Additionally, an IR transceiver of the location sensing unit 144 may have established a communication link with a sensor communicatively coupled to a virtual data provider system 404 and receives location identifying data from the virtual data provider system. In another example, image data detected or captured by the image capture devices 113 is uploaded to a virtual data provider system 404 executing on a network accessible computer system 12, which identifies the location in the image data based on stored image data, and notifies the information display application 414 executing on the personal A/V apparatus of the location.

Figure 11A:
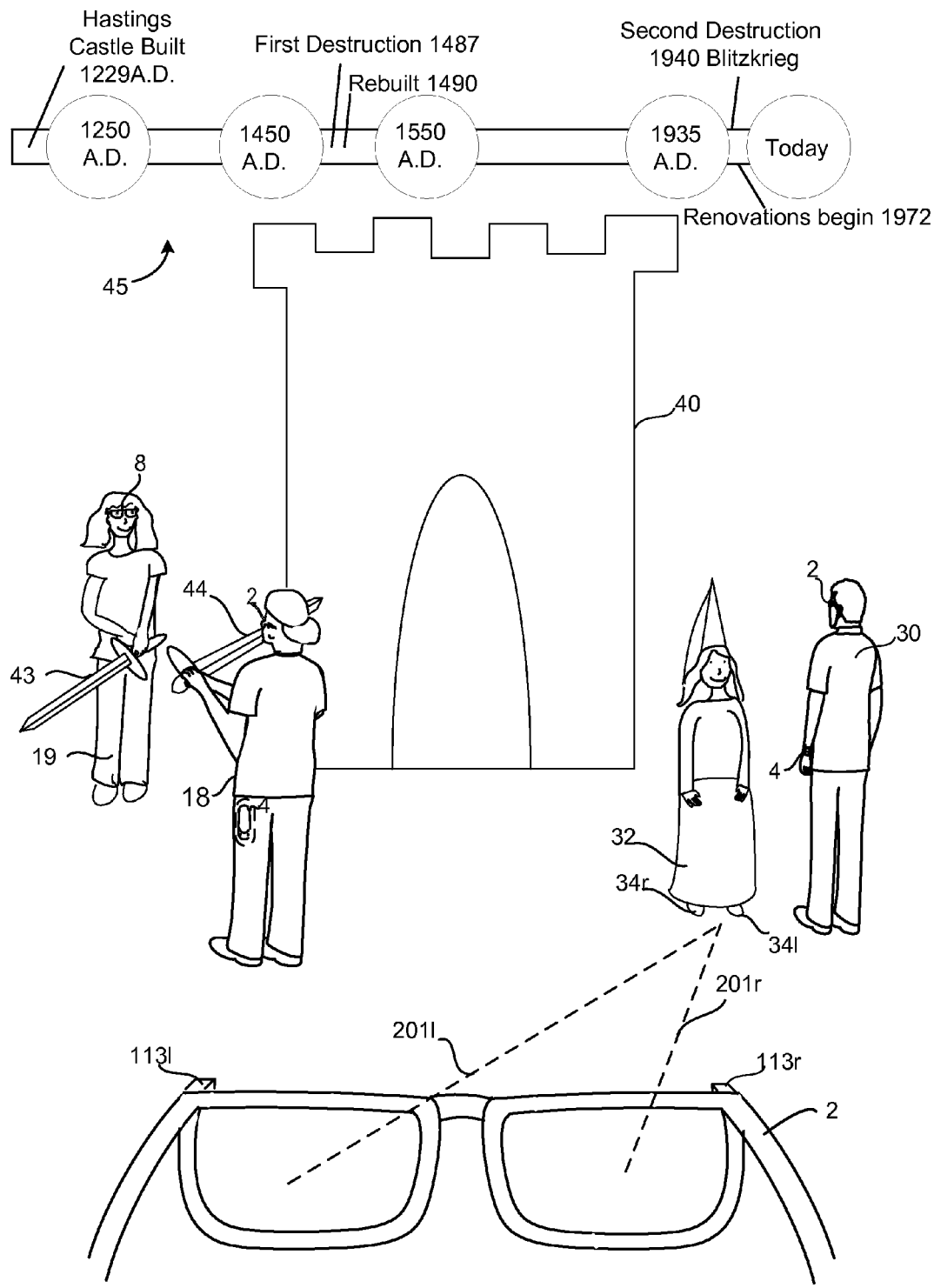
FIG. 11A illustrates an example of virtual data augmenting a real location with shared viewing of the virtual data.

In step 562, the object recognition engine 192 automatically identifies one or more objects in a display field of view of the near-eye, augmented reality display based on a three dimensional mapping of objects in the physical location. In step 564, user input indicating selection of a previous time period is identified. As illustrated in the example of FIG. 11A, a timeline may be provided by the information display application 414 with time periods listed, events listed or both. A user may select by a user physical action like a finger pointing, a gaze duration exceeding a threshold, or in other examples gaze duration and voice data confirming a selection. The information display application 414 on the personal A/V apparatus may identify the time period or event to the information display application 414 executing in a virtual data provider system 404 which sends 3D virtual data for the time period or event back to personal A/V apparatus.

The information display application 414 may select or prioritize 3D virtual data for presentation to the user based on user profile data. Some examples of user profile data which may be used as a basis are an age of a user, personal interests like politics or a field of study (e.g. engineering), or hobbies like a sport followed or played or collecting glass art. In some examples, a user may select an enhancement package of 3D virtual data associated with the previous time period from a menu of choices in the display using natural user interface (NUI) input. In step 566, 3D virtual data associated with the previous time period is displayed based on a user perspective associated with the display field of view by the virtual data engine 195.

There may be virtual data which another user has uploaded for the user to see when visiting the place of interest. For example, a first user may capture image data including his son sword fighting with a virtual knight or a regular digital photograph image of him in front of a castle. The first user uploads the image data to the virtual data provider system 404 as a virtual tag and identifies other users who may see the image data when the virtual knight is in their display fields of view or when looking at the castle. The virtual tag is linked with the objects of the virtual knight and the castle and the selected users and stored by the virtual data provider system 404, e.g. in image and location data 410.

The identification processing when the user enters the physical location may also include a registration process, for example to ensure the user has paid the entry fee or has an electronic ticket. A second user's personal A/V apparatus sends user identification data, for example in a registration request to the network accessible computer system on which the virtual data provider is executing. The one or more processors on the personal A/V apparatus receive a 3D mapping of objects in the physical location which include object identifiers for the objects and also receive notification of a virtual tag associated with the user identification data and an object identifier of an object in the physical location associated with the tag. Responsive to identifying the object associated with the tag is in the display field of view of the near-eye, augmented reality display based on the object identifier, the virtual data associated with the tag is displayed. In other examples, the information display application may identify that the personal A/V apparatus 8 is within a proximity of the tagged object based on the 3D mapping or location data like an exchange of IR identifying tokens between a proximity sensor of the apparatus 8 with a sensor associated with the tagged object, GPS data depending on the precision available or a combination of these. A message may be displayed or played by the personal A/V apparatus identifying the tagged object and directions to its location so the user knows where to look to see the tag.

FIG. 6B is a flowchart of some exemplary steps of updating the display of objects associated with the previous time period due to a change in the display field of view. Users visiting a site move around the site to see what interests them better, and real objects in the site move under their own control as well. The scene mapping engine 306 in step 568 identifies a change in the display field of view, and in step 570 updates the displaying of the one or more 3D virtual objects associated with the previous time period based on the change in the display field of view.

FIG. 6C is a flowchart of an example of a process for implementing step 564 of identifying user input indicating selection of a previous time period. In step 572, the information display application 414 causes the virtual data engine 195 to display virtual data indicating a plurality of previous time periods by the near-eye, augmented reality display. In step 574, natural user interface (NUI) input of at least one user physical action of at least one body part indicating selection of the previous time period from the virtual data is identified by a natural user interface of the personal A/V apparatus, such as the examples described above with respect to gesture recognition, and eye based action detection.

FIG. 6D is a flowchart of another embodiment of a method for representing a physical location at a previous time period with three dimensional (3D) virtual data displayed by a near-eye, augmented reality display of a personal A/V apparatus. In this embodiment, a 3D mapping of the physical location identifying one or more 3D space positions of real and virtual objects in the physical location is received in step 576 from a scene mapping engine 306 executing on a network accessible computer system 12 like that associated with the image and audio processing engine 191N of a virtual data provider system 404 which provides virtual data, image data or both for the physical location.

In step 578, one or more user physical actions of at least one body part are interpreted as user input indicating a previous time period for representation by 3D virtual data, in step 580 the one or more user physical actions of at least one body part may also be interpreted as user input selecting at least one object in the physical location for augmentation with the 3D virtual data. For example, a first visitor's gaze duration at another visitor, a man, has selected him as an object to be augmented with virtual data, in this case clothing suited to the time period. The virtual clothing is registered to him in the display field of view of the personal A/V apparatus of the first visitor.

In step 582, the local copy of the information display application 414 on the personal A/V apparatus requests and receives 3D virtual data accessible by the virtual data provider system 404 for augmentation of the at least one object in the physical location from the information display application 414 of the virtual data provider system 404 executing on one or more network accessible computer systems 12. In step 584, the received 3D virtual data is displayed for the at least one object from a user perspective associated with a display field of view of the near-eye, AR display.

In some embodiments, a user may want to see how two things related in a past event or during a past time period. The relationship is of interest to a user. When a person sees another person looking and back and forth between objects, that may be a behavior indicating the other person has identified a relationship between the objects or wonder if one exists. A natural user interface based on gaze detection may also be programmed to recognize such behavior, and take action of identifying whether a relationship exists or not.

FIG. 6E is a flowchart of an embodiment of a process for selecting virtual data for display based on a gaze pattern of a user of the personal A/V apparatus. In 586, a natural user interface like one including the eye tracking system 134 and the eye tracking software 196 determine a gaze pattern of a user wearing the near-eye, augmented reality display indicating short gaze periods back and forth between at least two objects at the physical location. A short gaze period may be a predetermined time period, for example one based on empirical studies of human back and forth gaze patterns. Virtual data related to the at least two objects is downloaded. In step 588, the information display application 414 downloads virtual data for the at least two objects and determines whether the virtual data for the at least two objects includes virtual data showing a relationship between the at least two objects.

An example of a basis for making the determination is whether meta data for the virtual data downloaded identifies both specific objects in an interaction. For example, a user may be viewing a wooden fence at the Gettysburg National Battleground and a stone fence further up a hill. Meta data for the downloaded virtual data may include the persistent object identifiers for the wooden fence and the stone fence. The virtual data may be video re-enactment of an event known as "Pickett's Charge" in which many Southern soldiers died while trying to get over the wooden fence to advance up the hill to attack the Union soldiers behind the stone wall. In other examples, meta data for the virtual data may include types of objects for which interactions have been predefined. For example, gaze data may indicate a user is gazing at a variety of weapons used by knights, and virtual data of an animation of virtual knights fighting using the different weapons may be presented to the user. If virtual data showing a relationship is available, then in step 590, such virtual data is displayed. Otherwise, in step 592, virtual data related to each of the at least two objects may be displayed.

Figure 6F:
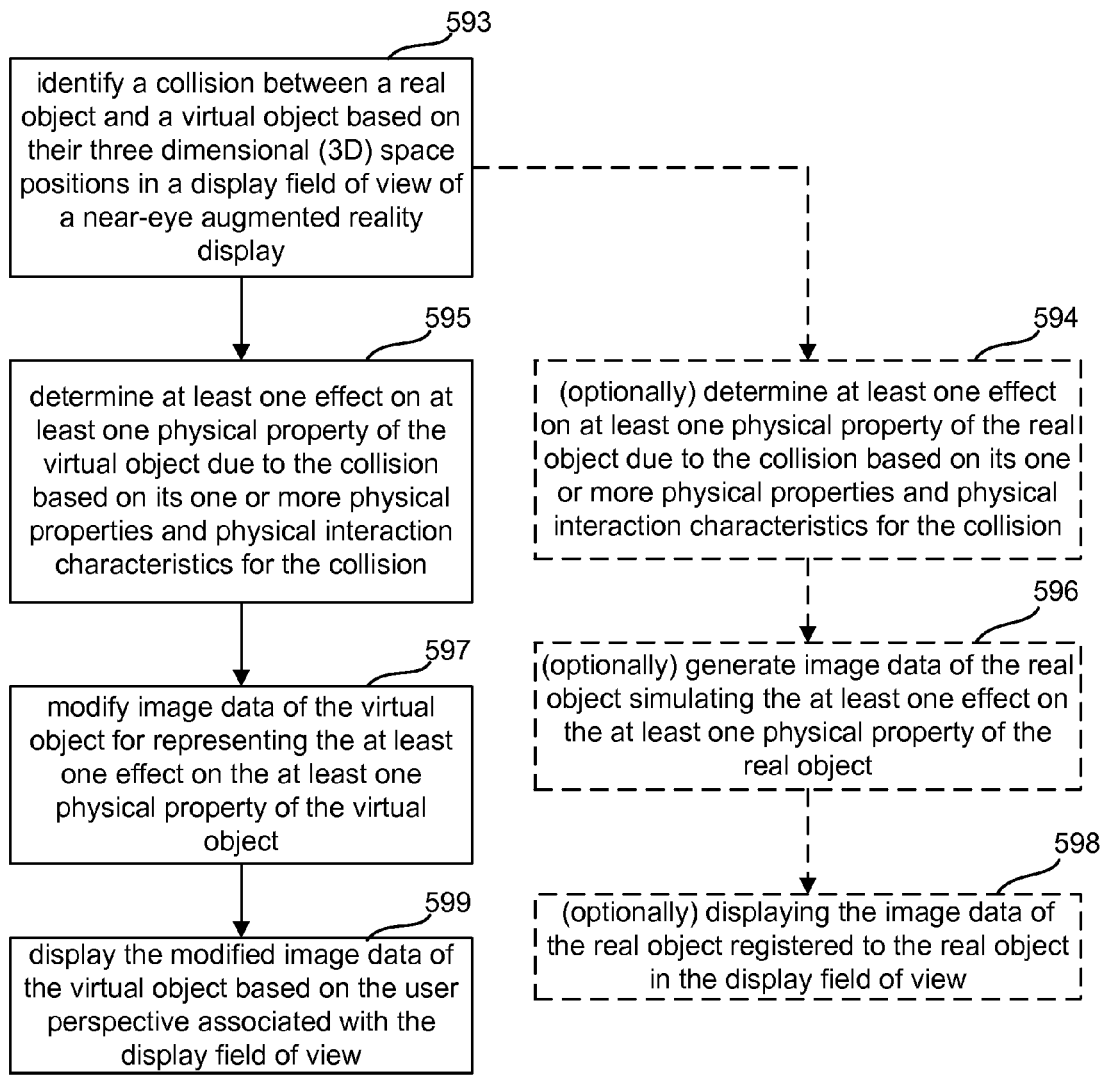
FIG. 6F is a flowchart of an embodiment of a method for displaying at least one effect on an object for use in a method for displaying a collision between a real object and a virtual object by an augmented reality display.

In some embodiments, a virtual object may be displayed, but may also be handled by or have other interactions with a real object. FIG. 6F is a flowchart of an embodiment of a method for displaying at least one effect on an object for use in a method for displaying a collision between a real object and a virtual object by an augmented reality physical A/V apparatus. The term "collision" in this specification is used in a physics sense of the word meaning a physical contact during which at least portions of different objects meet, and each object exerts a force upon the other causing an exchange of energy. For example, a handshake with a virtual person is a collision. In many cases, the collision changes at least the direction of motion of one or more moving objects or at least a change in momentum.

Using the software system embodiment of FIG. 3A as an example context for illustration, the scene mapping engine 306 or the physics engine 308 or an application 166 based on object position data supplied by the scene mapping engine 306 may identify a collision between a real object and a virtual object in step 593 based on their three dimensional (3D) space positions in a display field of view of a near-eye, augmented reality display. In one example, based on the parts of the objects meeting for the collision, for example hand and ball, the physics engine 308 may identify one or more types of collisions which an application like the information display application 414 has registered with it. For example, a dribble may be identified based on identification through motion data determined from image data of a human palm facing downward and pushing a virtual basketball based on tracking of the ball's position.

In step 595, the physics engine 308 determines at least one effect on at least one physical property of the virtual object due to the collision based on its one or more physical properties and physical interaction characteristics for the collision. The physics engine 308 simulates realistic behavior of objects based on forces being applied to objects. Physical interaction characteristics describe parameters inputs for a force equation and the resultant one or more forces which are changeable for each collision. An example of such a force equation is Newton's Second Law which is force (F) equals mass (m) times acceleration (a) or F=ma, which is also written as $F=\frac{1}{2}mv^2$ where v is velocity. An example of a physical interaction characteristic is a speed at which each object is traveling when they meet. So is each object's velocity which is a vector quantity indicating direction of the object and its speed in that direction. For an object like a human being, there may be different velocities for different parts of the body which may make up a composite velocity for a part making the contact in the collision. Another physical interaction characteristic is the composite mass for object or object part involved in the collision. A basketball thrown by a stationary human receives less force than a basketball thrown by a human riding a bicycle. There may be ambient factors like wind or rain which effect velocity as well.

Force vectors are determined by the physics engine 308 on each of the objects based on their physical properties like mass and tensile strength and physical interaction characteristics like velocity and environmental forces like gravity. A frictional force may be determined based on a coefficient of friction for a surface type of material. A spring force may be determined if a modulus of elasticity of an object satisfies criteria to be significant. A resting force may be determined based on the types of materials making up an object. The physics engine 308 simulates the force vectors action on each structural model of the respective real and virtual objects.

Besides determining resultant actions, a collision effect on each object is determined. At least one physical property of an object is effected by a collision, but not all effects are visible to the human eye. In some embodiments, criteria is stored for each collision effect for determining whether the effect is to be displayed. Some examples of criteria factors are a force strength, a force direction and a force density. What kind of effect is suitable is based on the forces involved but are also particular to the physical properties of a specific object like mass, structure as may be represented by size and shape, surface material and inner materials of an object.

Based on the changes to a structural model of the virtual object determined by the physics engine 308, in step 597 the virtual data engine 195 modifies the image data of the virtual object for representing the at least one effect on the at least one physical property of the virtual object and, in step 599, displays the modified image data of the virtual object. The physics engine 308 may also optionally identify audio data based on the at least one effect on the virtual object and its assigned one or more types of material, and may also identify a visual effect for display with the modified image data. The identification may be based on links registered by the information display application between an audio effect and a collision effect and between a visual effect and a collision effect. The 3D audio engine plays the audio data, and the virtual data engine 195 displays the visual effect.

Optionally, in step 594, the physics engine 308 determines at least one effect on at least one physical property of the real object due to the collision based on its one or more physical properties and the physical interaction characteristics for the collision. Based on the changes to the structural model for the real object determined by the physics engine 308, in step 596, the virtual data engine 195 generates image data of the real object simulating the at least one effect on the at least one physical property of the real object, and in step 598 displays the image data of the real object registered to the real object in the display field of view. Audio and other visual effects for the real object in the collision may be output as well.

FIG. 7 is a flow chart describing an embodiment of a process for providing a personalized experience to a user of a personal A/V apparatus viewing a historical perspective of a modern location. A personal A/V apparatus can be used to visually show the history of a certain location. In some embodiments, the system of FIG. 5 can be used to implement the process of FIG. 7. In some embodiments, the Central Control and Information Server 422 includes a database that describes images and scenes for various locations of interest. These images and scenes can be indexed based on location and date.

In step 602 of FIG. 7, the personal A/V apparatus connects to a local virtual data provider. It is contemplated that there will be a virtual data provider at each of the locations for which historical scenes and images can be inserted in the personal A/V apparatus. In step 604, the personal A/V apparatus 8 performs a protocol with the authorization module 416 to authenticate the user and be authorized to receive virtual data related to the respective location. In some embodiments for example, a user is authorized to access the service described herein if the information display application 414 on the user's personal A/V apparatus 8 can provide data indicating an entrance fee has been paid or the user has an electronic ticket.

In step 606, the personal A/V apparatus determines its location (e.g. based on detected location data like data from the location sensing unit 144 and captured image data of the site which can be matched for location identification). In step 606, an orientation of the near-eye, augmented reality (AR) display can be determined, for example based on date from the inertial sensing unit 132. Additionally in step 606, the gaze of the user is determined Based on eye tracking data from the eye tracking system 134 and a 3D mapping of the display field of view, this point of gaze may be determined by one or more processors of the personal A/V apparatus 8. In one example of determining gaze, the eye tracking software 196 executing on the one or more processors identifies a pupil position within each eye and models a gaze line for each eye extending from an approximated location of a respective fovea. The 3D scene mapping software 306 executing on the one or more processors determine a position in the display field of view where the gaze lines meet. This intersection is the point of gaze and it is within the Panum's fusional area for human eyes which is the area in which objects are in focus. Based on the 3D mapping of objects in the display field of view, a current object at which the gaze lines meet is a current object of focus.

In step 608, a request for virtual data of a previous time period, for example a historical period, for the current location is sent from the personal A/V apparatus to the virtual data provider along with its location, orientation and point of gaze. In step 610, the virtual data provider accesses image data for the previous time period requested. For example, virtual data provider 404 requests that image data from Central Control and Information Server. In this embodiment, in step 612, the virtual data provider system determines a current enhancement of virtual data to implement based on the location, orientation and point of gaze of the user. For example, a subset of the virtual data available for the location of the user for the previous time period may be formatted in an enhancement package, and the subset or enhancement package determined based on the location, orientation and gaze information provided in step 608. The determined enhancement of virtual data is sent to the personal A/V apparatus in step 614 which displays, e.g. renders and projects, the received virtual data of one or more virtual objects, virtual effects or both from the user perspective in the near-eye, AR display of the personal A/V apparatus in step 616. The location, orientation and gaze information for the personal A/V apparatus is continually updated as the user looks around and moves within the location. For example, a tourist at a castle may wish to see what the castle looked like in 1250 AD. Therefore, step 616 may include adding virtual objects to the walls of the castle and the grounds of the castle to make the castle look like it did in 1250 AD. In one embodiment, any of steps 610-620 can be repeated to show stop motion of the castle aging over time. Similarly, one or more of steps 612-620 may also be repeated for display updates as virtual data of an animation of virtual objects or video is displayed for the previous time period.

In an example, a user could be looking at the castle described above and ask to see what daily life looked like. Steps 614 and 616 will be continuously performed to show peasants, knights and royalty walking about the castle. If the user changes perspective as determined in step 618, for example, by changing the gaze, orientation, or both then new location, orientation information, gaze information or both will be determined in step 620 and sent to the virtual data provider. The process will then loop back to step 610 to access new image data if indicated for the new location, orientation or gaze information, and then proceed with determining current enhancements and providing new enhancements.

A personal A/V apparatus can also be used as a personal tour guide for tourists, or a docent for museum goers. For example, a system can determine the level of prior exposure to an attraction via the user's profile and then provide commentary, facts and suggestions to the user in regard to what the user is currently looking at.

FIG. 8A is a flow chart describing an embodiment of a process for using a personal A/V apparatus as a virtual tour guide. The system of FIG. 5 can be used to implement the process of FIG. 8A with each of the virtual data providers being arranged at different exhibits, attractions, etc. in a particular location. Note that the steps of FIG. 8A on the left hand column are performed at the personal A/V apparatus, and the steps on the right hand column of FIG. 8A are performed at the central computer and information server (or a combination of the central computer and information server in combination with virtual data provider).

In step 742, a personal A/V apparatus connects to the local virtual data provider. As the user moves throughout a location, the personal A/V apparatus may reconnect to different virtual data providers, which are in communication with Central Control and Information Server. In step 744, the personal A/V apparatus authenticates and authorizes the user with the virtual data provider system as discussed above for access to virtual data enhancements for the location. In step 746, the personal A/V apparatus will determine its location, orientation, and point of gaze as described above. In step 752, the personal A/V apparatus sends a request to the Central Control and Information Server 422 for information about the current location of the user and what the user is looking at along with location, orientation and point of gaze data to the Central Control and Information Server.

In step 756, the virtual data provider system accesses virtual data for the location indicated in the location data received from the personal A/V apparatus. The location data will include facts, suggestions, images, videos of the location. In step 758, the information display application 414 on the virtual data provider system includes determining what the user is looking at based on the location, orientation, point of gaze data and a 3D mapping of the location. For example, step 758 may determine that the user is looking at a particular artifact at a historical site. In step 760, the virtual data provider system accesses user profile (197, 322) as permitted by user settings to determine past experiences at the current location. In step 762, the virtual data provider system selects a subset of virtual data representing information for the location based on the past experiences of the user in this location as indicated by the user profile data accessed in step 760. In step 764, the subset of virtual data representing the selected information based on the user profile data for display by the personal A/V apparatus. The subset of virtual data selected may include textual facts, images, videos and suggestions of lesser known things to see in the area.

In step 766, the virtual data provider system will save an indication of what information was prepared and sent to the user. This information will be stored in the user profile so the next time the user is at this location, new information can be provided. In step 772, the personal A/V apparatus displays the information sent in the near-eye, augmented reality display of the personal A/V apparatus.

When visiting a site, people like to be able to ask questions which arise during their experience. FIG. 8B is a flow chart describing an embodiment of a process for providing an interactive tour guide. In step 782, the information display application 414 displays 3D virtual data of a tour guide. For example, an animated knight displayed in the near-eye, AR display may appear to walk with a person through castle grounds. The information display application 414 receives recognized words and a notification that a question has been posed from the speech recognition engine 194, and in step 784 identifies a question of a wearer of the personal A/V apparatus based on natural user interface input data including at least voice data. Keyword searching on the question may be performed in order to identify electronic data including an answer to the question. The information display application 414 may include a natural language presentation software sub-module executing in the personal A/V apparatus which formulates keywords in search results into sentences. Furthermore, at a place of interest, there are frequently asked questions and corresponding answers which may be stored and subsequently searched. Additionally, a human may be located elsewhere, for example at the main visitor center, who monitors the different audio data for various users at the place of interest, and can insert an answer in real time for the virtual tour guide to respond with when a visitor's question is not being addressed based on retrieved data. In step 786, 3D audiovisual virtual data is output of the tour guide responding to the question.

Figures 9A, 9B:
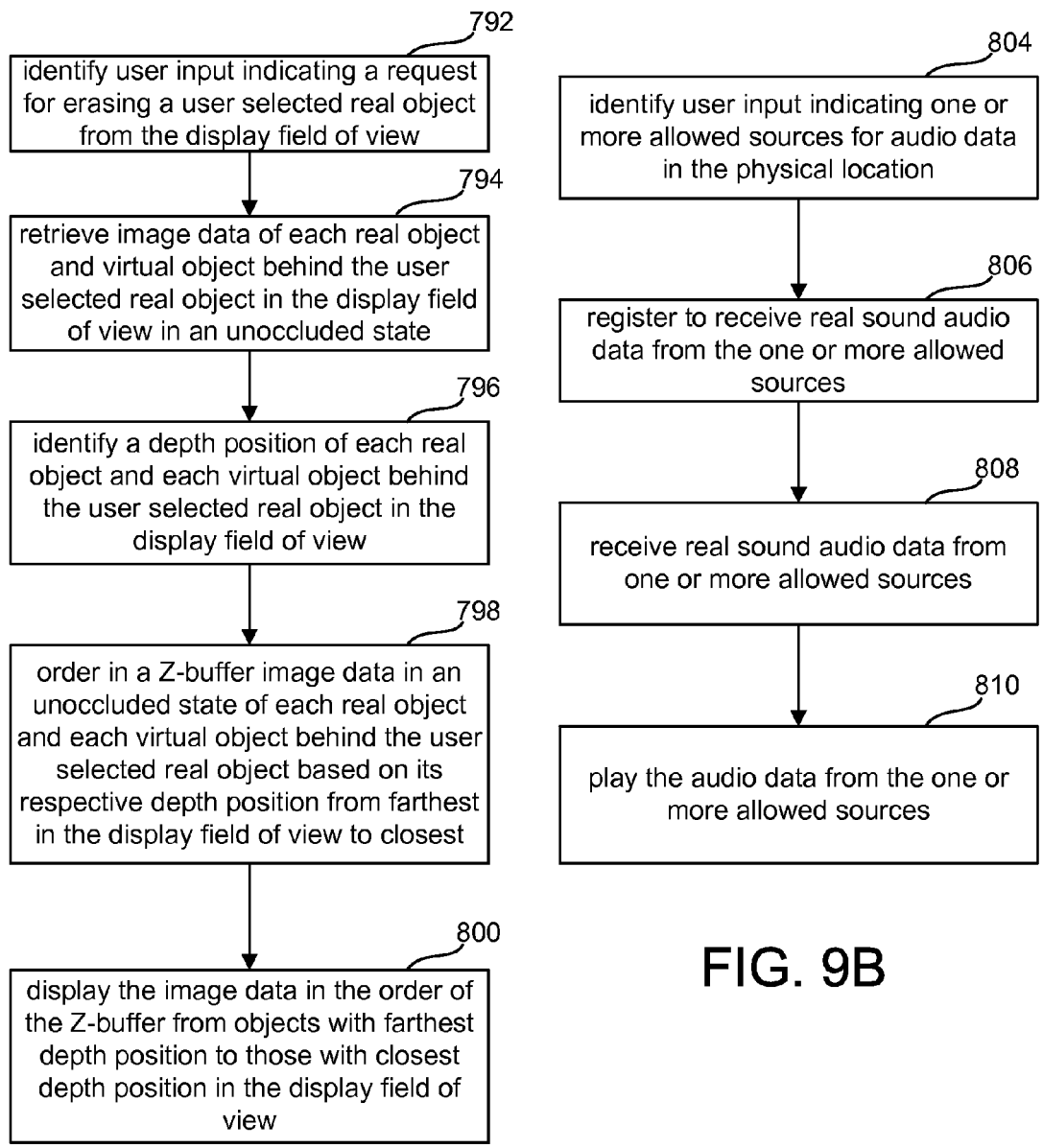
FIG. 9A is a flow chart describing an embodiment of a method for erasing a user selected real object from a display field of view.
FIG. 9B is a flow chart describing an embodiment of a method for selectively filtering real audio data.

Popular places of interest are often crowded, and another visitor can block a view of a real object, particularly when using an optical see-through display, to which virtual data is to be registered for a presentation in a user's display. A user may request erasure of a virtual object as well, perhaps to better focus on another virtual object. Erasing a computer generated image is accomplished by not displaying that image. Erasing a real object is a bit more complicated. FIG. 9A is a flow chart describing an embodiment of a method for erasing a user selected real object, like another visitor, from a display field of view. In step 792, the information display application 414 identifies user input indicating a request for erasing a user selected real object from the display field of view. The information display application 414 identifies the real object for erasure to the virtual data engine 195. In step 794, the virtual data engine 195 retrieves image data of each real object and virtual object behind the user selected real object in the display field of view in an unoccluded state.

As mentioned above, in some embodiments, the virtual data provider system captures image of the place of interest in real time. The image data, and depth data if available, may be that uploaded from other personal A/V apparatus 8 or from other capture devices at fixed points in the location to capture image data, and depth data if depth sensitive, at a range of view points, preferably providing a 360 degree view of the real objects in the location. The captured data provides a source of image data of the real objects unoccluded from different view points and having an appearance close in time to the appearance of the real objects behind the object to be erased at the time of erasure. Time stamps on the image data can be used to find image data of unoccluded real object behind the object to be erased from the user perspective, e.g. at a greater depth in the view dependent coordinate system than the object to be erased. Image data of individual real objects can be cut so the real objects can be translated, scaled, rotated, and depth adjusted for fitting a user perspective.

In step 796, a depth position of each real object and each virtual object behind the user selected real object in the display field of view is identified, for example based on captured or derived depth data for the real object and positions identified for a virtual object by an application. The network accessible 3D mapping may also be used for identifying the depth positions. A user typically wants something or someone erased so that virtual data is registered properly in the display to a real object which may be behind the virtual object. In step 798, the virtual data engine 195 orders in a Z-buffer image data in an unoccluded state of each real object and each virtual object behind the user selected real object based on its respective depth position from farthest in the display field of view to closest. The real objects in the volume behind the object to be erased are represented by image data and layered to appear at their proper depth positions while also occluding the real object to be erased. In some embodiments with an optical see-through display, the display can be operated in a mode wherein the display field of view of real and virtual objects is displayed as image data like in a video-see mode. In other embodiments, a portion of the display for the volume behind the object to be erased displays real objects as image data while other portions of the display still pass through reflected light from real objects so the user sees them with natural sight.

In step 800, the image data in the order of the Z-buffer is displayed from an object with the farthest depth position to an object with the closest depth position in the display field of view. The tracking of the object to be erased, the ordering in the Z-buffer and the displaying of the image data at proper depth positions is repeatedly being performed while the real object for erasure is still in the user display field of view.

FIG. 9B is a flow chart describing an embodiment of a method for selectively filtering real audio data. As people will be viewing virtual data of their own selection and time frame, most people will be using audio output devices placed in one's ears commonly referred to has earphones or earbuds or on one's ears like headphones. These audio output devices tend to block real world sounds as the user turns up volume on a virtual data presentation. A user may wish to enjoy a presentation, but also wishes to hear what another person like a friend or family member says as they watch virtual data at a site. In step 804, the information display application 414 identifies user input indicating one or more allowed sources for audio data in the physical location. For example, a menu may be displayed indicating a default selection like play audio data from real safety personnel at the place of interest. In step 806, the information display application 414 communicates over one or more networks with a personal A/V apparatus of an allowed source to register to receive audio data from the allowed user source. The audio data from the allowed user source is data detected by the microphone 110 of the source personal A/V apparatus and identified by the speech recognition engine 194 as the voice data of the allowed user source. Voice data for recognition may be stored in user profile data. In many embodiments, the registration process includes a step checking the registering user is authorized to receive audio data of the source.

In step 808, real sound audio data is received from one or more allowed sources for the physical location, in step 810, the 3D audio engine plays the real sound audio data from the one or more allowed sources. Real sounds from an allowed user source may also be picked up from the user's own microphone and identified via stored voice data in the accessible user profile data as being that of an allowed source.

A user may wish to see an object of interest close up without moving towards the object, or may wish to see farther back for a broader perspective of an object within a place of interest, for example to see virtual data of a restored version of a sculpture presently in need of repair. However, having to wait for a companion, or being schedule to meet at a spot at a certain time or not wanting to work through a crowd may deter the user from moving to the physical place for the desired vantage point.

Figure 10A:
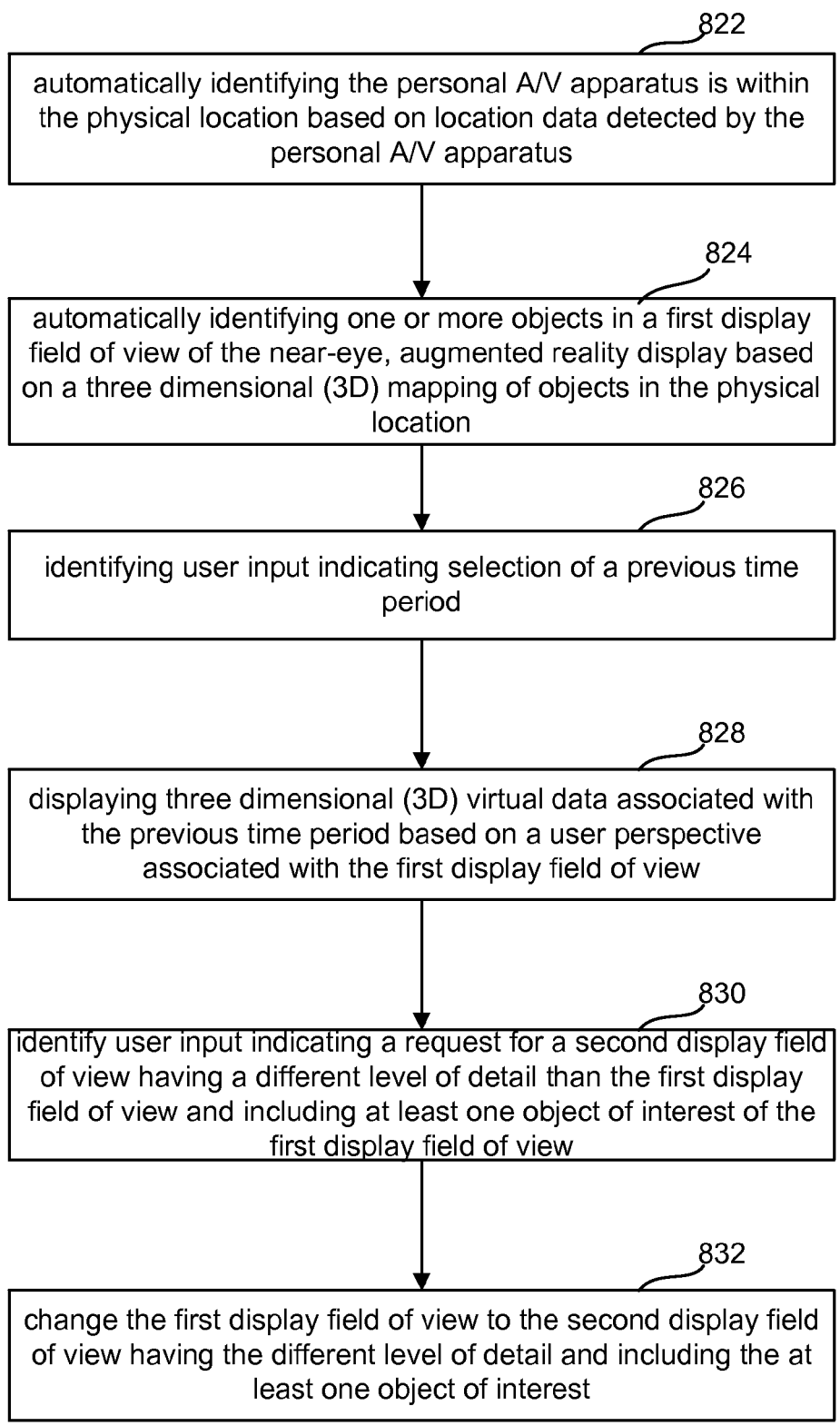
FIG. 10A is a flowchart of another embodiment of a method for changing a display field of view to another display field of view having a different level of detail.

FIG. 10A is a flowchart of another embodiment of a method for changing a display field of view to another display field of view having a different level of detail. In step 822, as discussed above for FIG. 6A, the information display application 414 automatically identifies the personal A/V apparatus is within the physical location based on location data detected by the personal A/V apparatus. In step 824, the object recognition engine 192 automatically identifies one or more objects in a first display field of view of the near-eye, augmented reality display based on a three dimensional (3D) mapping of objects in the physical location. In step 826, user input indicating selection of a previous time period is identified.

In step 828, three dimensional (3D) virtual data associated with the previous time period is displayed based on a user perspective associated with the first display field of view. In step 830, user input indicating a request for a second display field of view having a different level of detail than the first display field of view and including at least one object of interest of the first display field of view is identified. For example, a gaze pattern back and forth between two objects in two different areas of the location may result in displaying the objects from a virtual farther away perspective so both objects appear in same display field of view. In another example, a panning camera effect may be used in changing the display field of view from being focused on one object to another when the objects are too far apart to be visible to a human eye in a display field of view.

In step 832, the first display field of view is changed to the second display field of view having the different level of detail and including the at least one object of interest. For example, a gaze duration exceeding a gaze duration time criteria on an object may be identified as user input indicating a camera close-up effect.

Other examples of camera effects which may be used in changing display fields of view include zoom effects like zooming in and zooming out and a flying camera effect in which the display field of view gradually changes with intermediate display fields of view. For example, in a fly-in effect, the display field of view changes gradually by inserting intermediate display fields of view from a farther away perspective of an object of interest to a closer perspective of the object of interest. A fly-out effect is the opposite effect of appearing to gradually move farther and farther away from the object of interest.

Figure 10B:
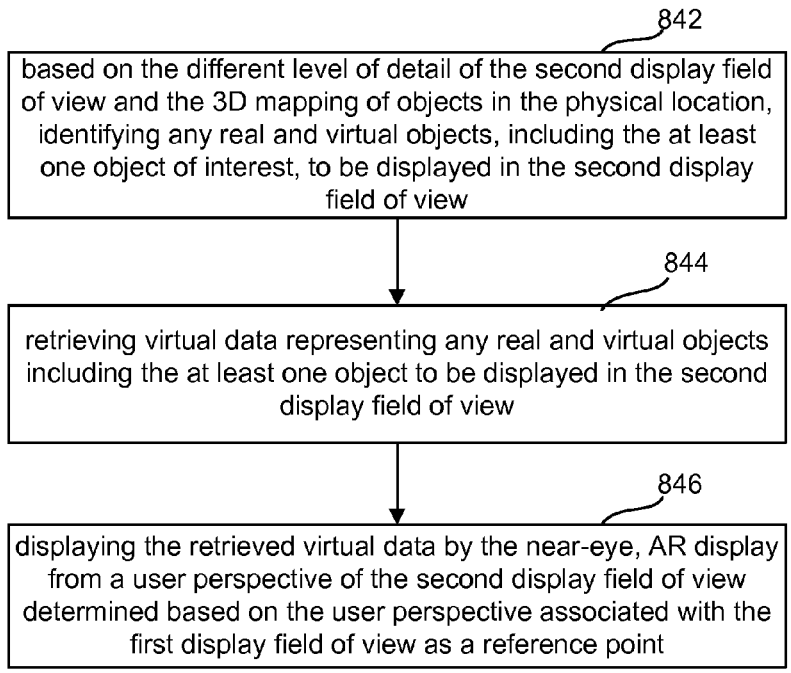
FIG. 10B is a flowchart of an embodiment of a process for changing the first display field of view to a second display field of view having the different level of detail.

FIG. 10B is a flowchart of a process for changing the first display field of view to a second display field of view having the different level of detail. In step 842, based on the different level of detail of the second display field of view and the 3D mapping of objects in the physical location, the information display application 414 identifies any real and virtual objects, including the at least one object of interest, to be displayed in the second display field of view. In step 844, virtual data representing any real and virtual objects including the at least one object to be displayed in the second display field of view is retrieved, e.g. from local temporary storage of previously downloaded data or from the virtual data provider system 404. In step 846, the retrieved virtual data by the near-eye, AR display is displayed by the virtual data engine 195 from a user perspective of the second display field of view determined based on the user perspective associated with the first display field of view as a reference point.

Figure 10C:
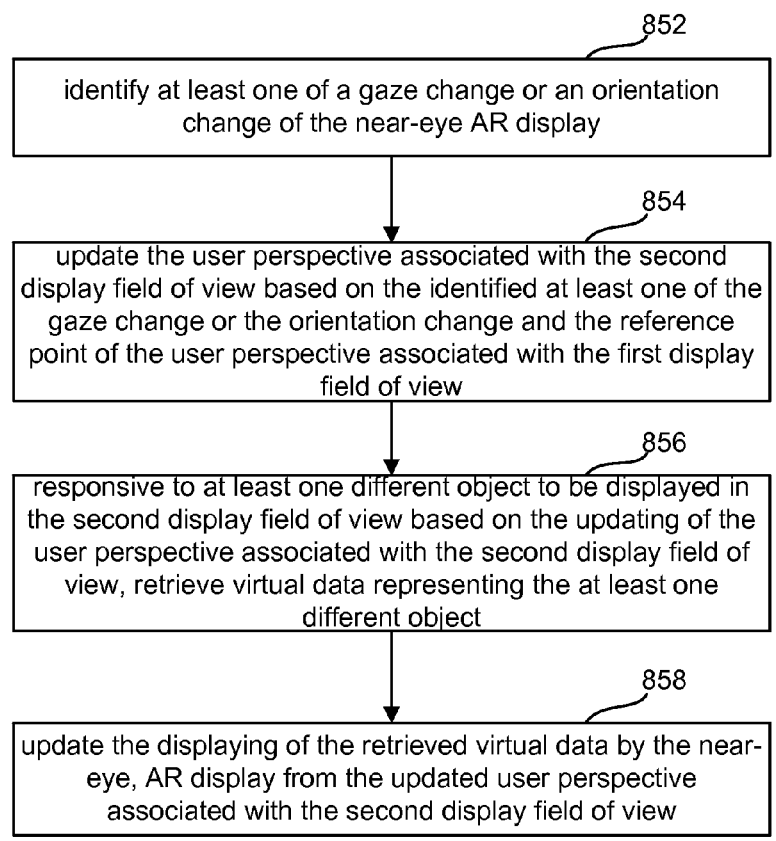
FIG. 10C is a flowchart of a process for updating a user perspective associated with the second display field of view.

FIG. 10C is a flowchart of a process for updating a user perspective associated with the second display field of view. In step 852, based on eye data and data from the inertial sensing unit 132, the scene mapping engine 306 identifies at least one of a gaze change or an orientation change of the near-eye AR display, and in step 854 updates the user perspective associated with the second display field of view based on the identified at least one of the gaze change or the orientation change and the reference point of the user perspective associated with the first display field of view. In step 856, responsive to at least one different object to be displayed in the second display field of view based on the updating of the user perspective associated with the second display field of view, the information display application 414 retrieves virtual data representing the at least one different object, and the virtual data engine 195 in step 858 updates the displaying of the retrieved virtual data by the near-eye, AR display from the updated user perspective associated with the second display field of view.

FIG. 11A illustrates an example of virtual data augmenting a real location with shared viewing of the virtual data. In this illustrative example, a family of Bob 30, his two children Susan 19 and Joe 18 and wife Mary (not shown) looking from behind a near-eye, augmented reality display device 2, an optical see-through one in this example, are visiting a renovated castle called "Hastings Castle" for illustrative purposes. Bob's personal A/V apparatus 8 is embodied in an eyeglasses type of optical see-through display device 2 as described above and a wrist support companion processing module. Susan wears a personal A/V apparatus 8 like that illustrated in FIG. 1B in which the near-eye, AR display device 2 does not use a separate companion processing module 4, and Joe's near-eye, display device 2 is in communication with his smartphone 4 embodying the functionality of a companion processing module.

In this embodiment, the family members have decided to enter a sharing mode or community mode so that a first user can see the same virtual data a second user in the community mode has downloaded and has displayed when that virtual data is also in the first user's display field of view. Although each user sees the same virtual data, the virtual data is displayed from a user perspective associated with each near-eye, augmented reality display as in the sword example described below. Each sharing member has selected the sharing mode and a time period of around 1250 A.D from the timeline, for example via a finger point at the circle for 1250 A.D. in the displayed timeline 45, which is a couple of decades after Hastings Castle was built in 1229 A.D. Other previous time periods may have been selected from the timeline 45 by selecting a representative period like 1450 A.D., 1550 A.D., 1935 A.D. or today or an event like the first building of Hastings Castle in 1229 A.D., the First Destruction of the castle in 1487, the castle as rebuilt in 1490, then its Second Destruction during a blitzkrieg in 1940 and then as it is renovated today.

As Mary is resting on a hill in front of the castle and taking in the front view of the castle as it looked in 1250 A.D., she notes her children Susan 19 and Joe 18 are planning to fight again, but at least this time it is with virtual respective swords 43 and 44 which are virtual data available from a virtual data provider system 404 associated with Hastings Castle. The movement of the swords by Susan and Joe are controlled by the physics engine 308 in accordance with their respective physics models, which are based on the individual properties of the swords. While Joe sees the sword 44 near his face, Susan sees Joe's sword up around his face, and Mary sees both Susan holding her sword 43 lower and sees Joe holding his near his face from her perspective on the hill. For the user perspective associated with Mary's display device 2, Susan's virtual sword 43 partially occludes Susan's body, and Joe's real head partially occludes his virtual sword. Like other aspects of the view, an occlusion change with real and virtual object movement as well as changes in the user perspective.

At the present moment, Mary is gazing at the feet 34 of a virtual tour guide 32 listening and responding to Bob's queries about the material user for the castle around 1250 A.D. The virtual tour guide 32 is a virtual object appearing as a court lady in the dress for the selected time period, and Mary sees her from her perspective on the hill. Mary's eye tracking system 134 and software 196 notify the information display application 414 that Mary has exceeded gaze duration criteria for the object or objects of interest of the virtual guide's feet. The information display application 414 may request whether Mary wishes a closer look at the feet via a displayed message or may change the display field of view slowly using Mary's line of sight or gaze lines as a reference line along which the display field of view is centered in intermediate display fields of view ending at a close-up of the feet 34.

Figure 11B:
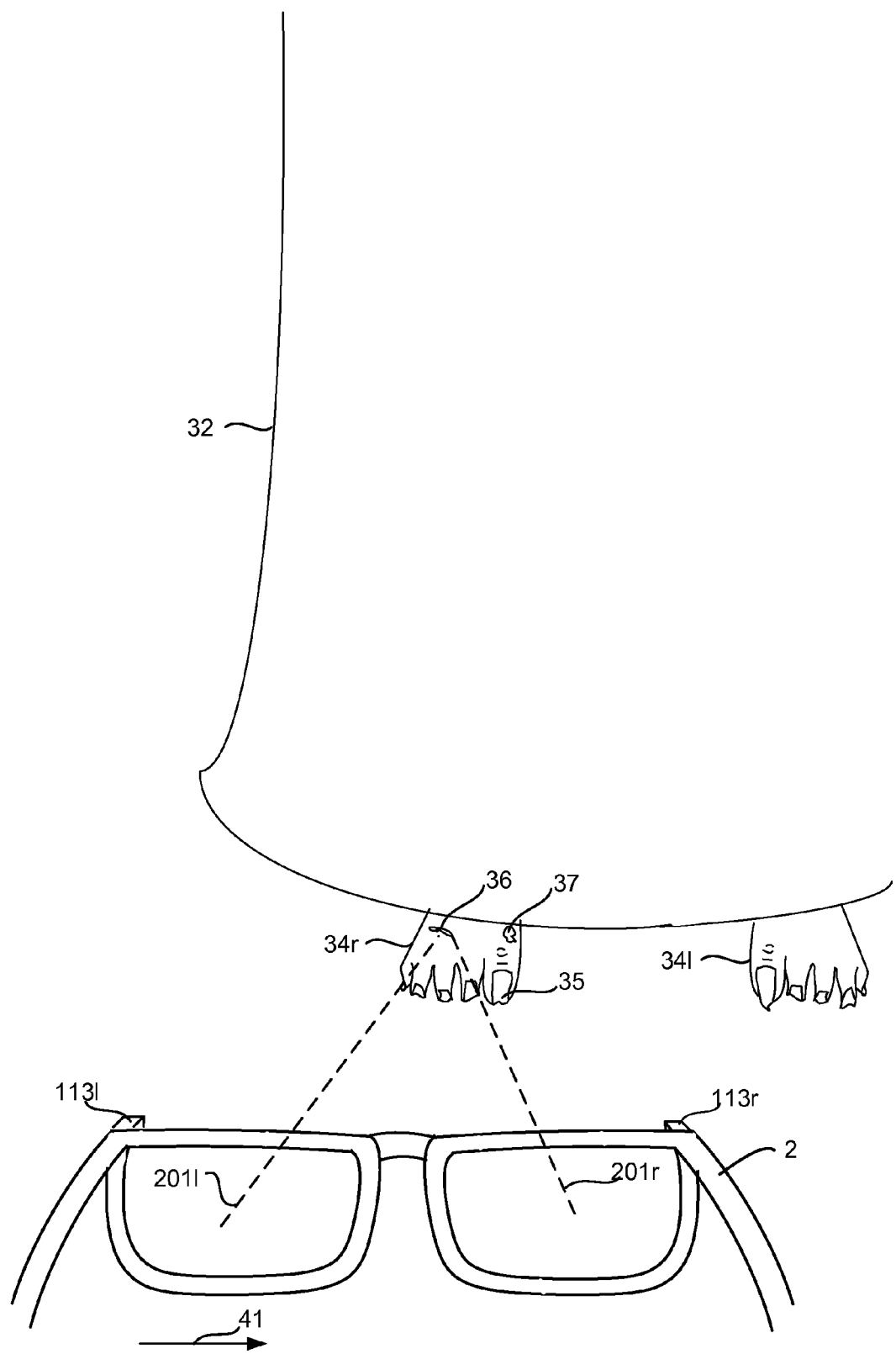
FIG. 11B illustrates an example of a close-up display view triggered by user gaze at an element of a virtual object.

FIG. 11B illustrates an example of a close-up display view triggered by user gaze at an element of a virtual object. As illustrated, the virtual guide 32 is barefoot which is what Mary thought and had not noticed previously. As indicated by the arrow 41, Mary has moved her head a little to the right, so the feet have moved a little to her left and are more centered in her field of view. The close-up shows the toe nails, such as illustrated by representative toe nail 35, are unkempt. Besides a wart 37, there is also what looks like an infected cut 36 on the tour guide's right foot 34r. The cut is Mary's current focus. The gaze duration on the feet and change to the close-up of them may have prompted the information display application 414 to download stored statements regarding the feet and has audio data of the virtual tour guide 32 making those statements output by the audio engine 304. Additionally, a question from Mary like "Are you barefoot?" may have triggered a response. For example, during the change to close-up, the virtual guide 32 may state, "Yes, I'm barefoot. Even court ladies were typically barefoot when the weather was warm as shoes were still an expensive luxury." Noting the focus on the infected cut, store data regarding death from infection being common in the time period may be output as the virtual guide 32 appearing to speak the audio of the stored data.

In some embodiments, virtual data representing a result from an alternate outcome of an event may also be available for display. A selection of alternate outcomes may be selectable from the time line or be displayed responsive to determining a user question is asking "what if that did not happen, or did happen." In the case of Picket's Charge, virtual data showing outcome related data may be a virtual overlay with visual aids showing different scenarios of Southern positions if the Charge had not been made. A virtual overlay of different attack plans may also be shown. A predetermined video sequence of why that aspect mattered to the battle and what might have happened if they'd used different tactics may be played. A virtual re-enactment of an alternative plan which could have been used may be displayed.

Similarly in the castle example, if there has been a battle at the castle in 1265 AD, in which the Anglo Norman aristocracy were narrowly victorious, an alternative history branch may be selectable to show how life in the castle might have changed over the subsequent 100 years under the new owners with their different culture. For example, how the peasants, knights and ladies may have been dressed if the Saxon side had won or the likely physical state of the castle if a siege had occurred in the battle. There may also be data displayed on one or more historians speculation as to how important for the national balance of power an alternate outcome might have been.

Many of the embodiments described herein include storing data about a user, objects and places. This data is then used to augment reality when looking through a personal A/V apparatus. To allow for the efficient storage of such data and exchange of such data, it is contemplated to have a predetermined standard format for storing that data. An example of such a format is referred to as a holographic file format. Use of a holographic file format will allow for portability of data between platforms, compressing the data, use of smart objects, and facilitating virtual representation of real world objects. For more information about some embodiments of a holographic file format, see U.S. patent application Ser. No. 13/430,972, Geisner et al., entitled "Personal Audio/Visual System with Holographic Objects," filed Mar. 27, 2012, which is hereby incorporated herein by reference.

Figure 12:
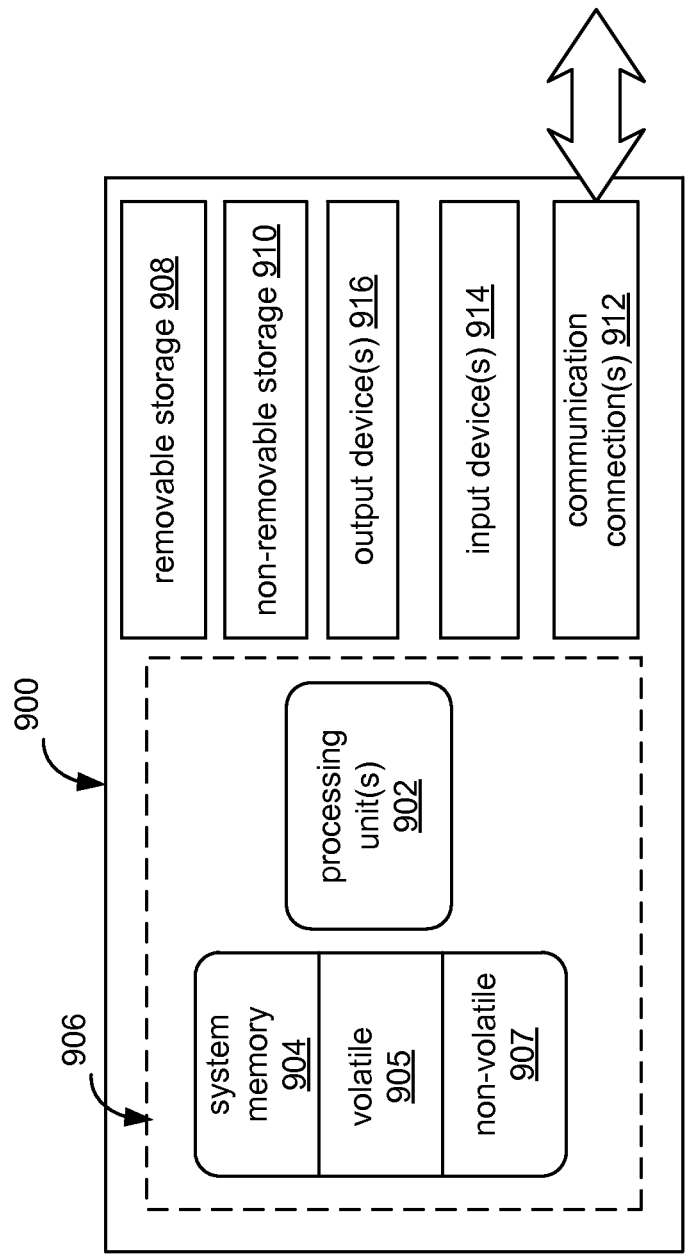
FIG. 12 is a block diagram of one embodiment of a computing system that can be used to implement a network accessible computing system or a companion processing module.

FIG. 12 is a block diagram of one embodiment of a computing system that can be used to implement one or more network accessible computer systems 12 or a companion processing module 4 which may host at least some of the software components of computing environment 54 or other elements depicted in FIG. 3A. With reference to FIG. 12, an exemplary system includes a computing device, such as computing device 900. In its most basic configuration, computing device 900 typically includes one or more processing units 902 including one or more central processing units (CPU) and one or more graphics processing units (GPU). Computing device 900 also includes memory 904. Depending on the exact configuration and type of computing device, memory 904 may include volatile memory 905 (such as RAM), non-volatile memory 907 (such as ROM, flash memory, etc.) or some combination of the two. This most basic configuration is illustrated in FIG. 11 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 12 by removable storage 908 and non-removable storage 910.

Device 900 may also contain communications connection(s) 912 such as one or more network interfaces and transceivers that allow the device to communicate with other devices. Device 900 may also have input device(s) 914 such as keyboard, mouse, pen, voice input device, touch input device, etc. Output device(s) 916 such as a display, speakers, printer, etc. may also be included. These devices are well known in the art so they are not discussed at length here.

The example computer systems illustrated in the figures include examples of computer readable storage devices. A computer readable storage device is also a processor readable storage device. Such devices may include volatile and non-volatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computer.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A method for representing a physical location at a previous time period with three dimensional (3D) virtual data displayed by a near-eye, augmented reality (AR) display of a personal audiovisual (A/V) apparatus comprising:
    automatically identifying the personal A/V apparatus is within the physical location based on location data detected by the personal A/V apparatus;
    automatically identifying one or more objects in a display field of view of the near-eye, augmented reality display based on a three dimensional mapping of objects in the physical location, and indentifying at least two of the objects as having a relationship;
    identifying user input indicating selection of a previous time period from a plurality of different previous time periods; and
    displaying three-dimensional (3D) virtual data representing the one or more objects in the physical location for the selected previous time period and the relationship between the at least two objects in the display field of view and based on a user perspective associated wit the display field of view.

2. The method of claim 1 further comprising:
identifying a change in the display field of view; and
updating the displaying of the 3D virtual data associated with the previous time period based on the change in the display field of view.

3. The method of claim 1 further comprising:
displaying virtual data indicating a plurality of previous time periods by the near-eye, augmented reality display; and
identifying user input indicating selection of the previous time period further comprises identifying natural user interface (NUI) input of at least one user physical action of at least one body part indicating selection of the previous time period from the virtual data from data captured by at least one capture device of the personal A/V apparatus.

4. The method of claim 3 wherein the virtual data indicating the plurality of previous time periods is a timeline indicating a plurality of past events.

5. The method of claim 3 wherein the at least one user physical action of at least one body part is a gesture performed by at least one body part.

6. The method of claim 1 wherein automatically identifying one or more objects in the display field of view of the near-eye, augmented reality display based on the three dimensional mapping of objects in the physical location further comprises:

determining a gaze pattern of a user wearing the near-eye, augmented reality display indicating short gaze periods back and forth between the at least two objects at the physical location, determining whether virtual data showing the relationship between the at least two objects is available for download, and responsive to virtual data showing the relationship between the at least two objects is available, retrieving the virtual data showing the relationship between the at least two objects.

7. The method of claim 1 further comprising:

identifying a collision between at least one real object and at least one virtual object based on their 3D space positions in the display field of view of the near-eye, augmented reality display;

determining at least one effect on at least one physical property of the at least one virtual object due to the collision based on its one or more physical properties and physical interaction characteristics for the collision;

modifying image data of the at least one virtual object for representing the at least one effect on the at least one physical property of the at least one virtual object; and displaying the modified image data of the at least one virtual object based on the user perspective associated with the display field of view.

8. The method of claim 1 further comprising:

displaying 3D virtual data of a tour guide;

identifying a question of a wearer of the personal A/V apparatus based on natural user interface input data including at least voice data captured by a microphone of the personal A/V apparatus; and outputting 3D audiovisual virtual data of the tour guide responding to the question by one or more audio output devices of the personal A/V apparatus and the near-eye, augmented reality display.

9. A personal audiovisual (A/V) apparatus for representing a physical location at a previous time period with three dimensional (3D) virtual data comprising:

a near-eye, augmented reality display having a display field of view and being supported by a near-eye support structure;

one or more processors being communicatively coupled to a network accessible computer system for accessing one or more memories storing a virtual tag associated with one or more objects, 3D virtual data associated with the one or more objects in the physical location and the 3D virtual data representing the one or more objects in the physical location for at least one previous time period from a plurality of different time periods;

the one or more processors receiving a 3D mapping of the physical location identifying one or more 3D space positions of real and virtual objects in the physical location;

a natural user interface (NUI) for interpreting one or more user physical actions of at least one body part as user input indicating a previous time period for representation by 3D virtual data and as user input selecting at least one object in the physical location for augmentation with the 3D virtual data; and the one or more processors controlling the near-eye, augmented reality display of the personal A/V apparatus for displaying of the 3D virtual data for the at least one object in the at least one previous time period from a user perspective associated with the display field of view and displaying the linked object associated with the virtual tag in response to another user at the physical location previously uploading wit the virtual tag to the memory.

10. The apparatus of claim 9 wherein the near-eye, augmented reality display is an optical see-through, augmented reality display.

11. The apparatus of claim 9 wherein the natural user interface comprises the at least one capture device being supported by the near-eye support structure and a gesture recognition engine being executed by the one or more processors for identifying at least one of the one or more user physical actions as a gesture selecting the at least one object in the physical location to be augmented with the 3D virtual data.

12. The apparatus of claim 9 wherein the natural user interface comprises an eye tracking system being positioned by the support structure and eye tracking software being executed by the one or more processors for identifying at least one of the one or more user physical actions as an eye based action based on eye data from the eye tracking system.

13. The apparatus of claim 9 further comprising:

the one or more processors identifying user input indicating a request for erasing a user selected real object from the display field of view;

the one or more processors retrieving image data of each real object and virtual object behind the user selected real object in the display field of view in an unoccluded state;

identifying a depth position of each real object and each virtual object behind the user selected real object in the display field of view;

ordering in a Z-buffer the image data in the unoccluded state of each real object and each virtual object behind the user selected real object in the display field of view based on its respective depth position from farthest depth position in the display field of view to closest depth position in the display field of view; and displaying the image data in the Z-buffer in accordance with the ordering from farthest depth position in the display field of view to closest depth position in the display field of view.

14. The apparatus of claim 9 further comprising:

the one or more processors identifying user input indicating one or more allowed sources for audio data in the physical location;

a microphone of the personal A/V apparatus for capturing real sounds made in the physical location, and the one or more processors being communicatively coupled to receive real sound audio data representing the real sounds from the microphone and executing a sound recognition engine for identifying real sound audio data from the one or more allowed sources;

the one or more processors being communicatively coupled to at least one other personal A/V apparatus and registering with the at least one other personal A/V apparatus for receiving real sound audio data from the one or more allowed sources;

the one or more processors receiving real sound audio data identified as being from the one or more allowed sources; and the one or more processors executing an audio engine for playing the audio data from the one or more allowed sources for the physical location through at least one audio output device of the personal A/V apparatus.

15. The apparatus of claim 9 further comprising:

the one or more processors sending user identification data to the network accessible computer system;

the one or more processors receiving notification of the virtual tag associated with the user identification data and an object in the physical location associated with the tag; and responsive to identifying the object is in the display field of view of the near-eye, augmented reality display based on the object identifier, displaying virtual data associated with the virtual tag.

16. One or more processor readable storage devices comprising instructions which cause one or more processors to execute a method for representing a physical location at a previous time period with three dimensional (3D) virtual data displayed by a near-eye, augmented reality display of a personal audiovisual (A/V) apparatus comprising:

automatically identifying the personal A/V apparatus is within the physical location based on location data detected by the personal A/V apparatus;

automatically identifying one or more objects in a first display field of view of the near-eye, augmented reality display based on a three dimensional (3D) mapping of objects in the physical location;

identifying user input indicating selection of a previous time period from a plurality of different time periods displayed as a timeline in the first of view of the near eye, augmented reality display;

displaying (3D) virtual data associated with the previous time period from a user perspective associated with the first display field of view.

17. The one or more processor readable storage devices of claim 16 further comprising:

identifying user input indicating a request for a second display field of view having a different level of detail than the first display field of view and including at least one object of interest of the first display field of view; and changing the first display field of view to the second display field of view having the different level of detail and including the at least one object of interest.

18. The one or more processor readable storage devices of claim 17 wherein changing the first display field of view to the second display field of view having the different level of detail and including the at least one object of interest further comprises:

implementing a camera effect in changing the first display field of view to the second display field of view having the level of detail and including the at least one object of interest and wherein the camera effect comprises at least one of the following:

a close-up effect;

a zoom effect; and a flying camera effect.

19. The one or more processor readable storage devices of claim 17 wherein changing the first display field of view to the second display field of view having the different level of detail and including the at least one object of interest further comprises:

based on the different level of detail of the second display field of view and the 3D mapping of objects in the physical location, identifying any real and virtual objects, including the at least one object of interest, to be displayed in the second display field of view;

retrieving virtual data representing any real and virtual objects including the at least one object to be displayed in the second display field of view; and displaying the retrieved virtual data by the near-eye, AR display from a user perspective of the second display field of view determined based on the user perspective associated with the first display field of view as a reference point.

20. The one or more processor readable storage devices of claim 19 further comprising:

identifying at least one of a gaze change or an orientation change of the near-eye augmented reality display;

updating the user perspective associated with the second display field of view based on the identified at least one of the gaze change or the orientation change and the reference point of the user perspective associated with the first display field of view;

responsive to at least one different object to be displayed in the second display field of view based on the updating of the user perspective associated with the second display field of view, retrieving virtual data representing the at least one different object; and updating the displaying of the retrieved virtual data by the near-eye, AR display from the updated user perspective associated with the second display field of view.

* * * * *